United States Patent
Wakabayashi et al.

(10) Patent No.: US 10,057,794 B2
(45) Date of Patent: Aug. 21, 2018

(54) MOBILE COMMUNICATION BASE STATION AND METHOD FOR SELECTING A VIRTUAL CARRIER FOR MACHINE-TYPE COMMUNICATIONS BASED ON MEASUREMENTS OF CHANNEL CONDITIONS

(71) Applicant: SONY CORPORATION, Tokyo (JP)

(72) Inventors: Hideji Wakabayashi, Basingstoke (GB); Matthew William Webb, Basingstoke (GB); Yuichi Morioka, Basingstoke (GB); Stephen Truelove, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 290 days.

(21) Appl. No.: 14/649,680

(22) PCT Filed: Jan. 13, 2014

(86) PCT No.: PCT/GB2014/050078
§ 371 (c)(1),
(2) Date: Jun. 4, 2015

(87) PCT Pub. No.: WO2014/111694
PCT Pub. Date: Jul. 24, 2014

(65) Prior Publication Data
US 2015/0312783 A1 Oct. 29, 2015

(30) Foreign Application Priority Data

Jan. 16, 2013 (GB) .................................. 1300809.9

(51) Int. Cl.
*H04W 24/06* (2009.01)
*H04W 72/08* (2009.01)
(Continued)

(52) U.S. Cl.
CPC .......... *H04W 24/06* (2013.01); *H04L 1/0026* (2013.01); *H04L 1/20* (2013.01); *H04L 1/24* (2013.01);
(Continued)

(58) Field of Classification Search
CPC ............. H04W 72/08; H04W 72/1231; H04W 76/046; H04W 74/006; H04W 24/06;
(Continued)

(56) References Cited

U.S. PATENT DOCUMENTS

| 5,726,978 A | 3/1998 | Frodigh et al. |
| 2003/0003937 A1* | 1/2003 | Ohkubo ............... H04B 7/0608 455/517 |

(Continued)

FOREIGN PATENT DOCUMENTS

| EP | 1 845 678 A1 | 10/2007 |
| EP | 1 865 736 A1 | 12/2007 |

(Continued)

OTHER PUBLICATIONS

U.S. Appl. No. 14/650,931, filed Jun. 10, 2015, Wakabayashi et al.
(Continued)

*Primary Examiner* — Anez Ebrahim
(74) *Attorney, Agent, or Firm* — Xsensus, LLP

(57) ABSTRACT

Apparatus and method providing feedback on channel conditions in a wireless telecommunications system including a base station arranged to communicate with plural terminals device using frequencies spanning a system frequency bandwidth. At least one terminal device is a reduced capability terminal device including a tuneable transceiver configured to receive downlink transmissions from the base station using only a restricted frequency bandwidth which is smaller than and within the system frequency bandwidth. The reduced capability terminal device is configured to commu- (Continued)

nicate information derived from measurements of channel conditions to the base station. The information may include an indication of measured channel conditions for the different frequency locations, or an indication of one or more frequency locations for which the corresponding measurement of channel conditions meet a pre-defined selection criterion. The base station subsequently schedules downlink transmissions for the terminal device in taking account of the information received from the terminal device.

17 Claims, 17 Drawing Sheets

(51) Int. Cl.
| | | |
|---|---|---|
| *H04L 5/00* | (2006.01) | |
| *H04L 1/24* | (2006.01) | |
| *H04W 74/00* | (2009.01) | |
| *H04L 1/00* | (2006.01) | |
| *H04L 1/20* | (2006.01) | |
| *H04W 76/27* | (2018.01) | |
| *H04W 72/12* | (2009.01) | |
| *H04W 88/02* | (2009.01) | |
| *H04W 88/08* | (2009.01) | |

(52) U.S. Cl.
CPC .............. *H04L 5/003* (2013.01); *H04L 5/005* (2013.01); *H04L 5/006* (2013.01); *H04W 72/08* (2013.01); *H04W 72/1231* (2013.01); *H04W 74/006* (2013.01); *H04W 76/27* (2018.02); *H04L 5/0012* (2013.01); *H04W 72/1205* (2013.01); *H04W 88/02* (2013.01); *H04W 88/08* (2013.01)

(58) Field of Classification Search
CPC . H04L 1/20; H04L 5/003; H04L 5/006; H04L 5/005; H04L 1/24; H04L 1/0026
See application file for complete search history.

(56) References Cited

U.S. PATENT DOCUMENTS

| | | |
|---|---|---|
| 2005/0245258 A1 | 11/2005 | Classon et al. |
| 2005/0281226 A1 | 12/2005 | Lee et al. |
| 2008/0117867 A1 | 5/2008 | Yin et al. |
| 2010/0272086 A1* | 10/2010 | Jung ..................... H04W 48/02 370/338 |
| 2011/0250917 A1 | 10/2011 | Zhu et al. |
| 2012/0140702 A1* | 6/2012 | Takano ................ H04B 7/2606 370/315 |
| 2013/0023277 A1 | 1/2013 | Zhu et al. |
| 2013/0028113 A1 | 1/2013 | Zhu et al. |
| 2014/0003260 A1* | 1/2014 | Tabet .................. H04W 76/028 370/252 |
| 2014/0036820 A1* | 2/2014 | McNamara ........... H04L 5/0007 370/329 |

FOREIGN PATENT DOCUMENTS

| | | |
|---|---|---|
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2497742 A | 6/2013 |
| GB | 2497743 A | 6/2013 |
| WO | WO 97/01256 A1 | 1/1997 |
| WO | WO 2011/129902 A1 | 10/2011 |
| WO | WO 2012/104629 A2 | 8/2012 |

OTHER PUBLICATIONS

U.S. Appl. No. 14/650,927, filed Jun. 10, 2015, Webb, et al.
U.S. Appl. No. 14/651,882, filed Jun. 12, 2015, Webb, et al.
U.S. Appl. No. 14/650,991, filed Jun. 10, 2015, Wakabayashi, et al.
International Search Report dated Mar. 27, 2014 in PCT/GB2014/050078.
Search Report dated Aug. 5, 2013 in United Kingdom Patent Application No. GB1300809.9.
"Digital cellular telecommunications system (Phase 2+); Universal Mobile Telecommunications System (UMTS); LTE; Service requirements for Machine-Type Communications (MTC); Stage 1" 3GPP TS 22.368, ETSI TS 122 368, vol. 10.5.0, 2011, 18 pages.
Harri Holma, et al., "3.2 Basic System Architecture Configuration with only E-UTRAN Access Network" LTE for UMTS OFDMA and SC-FDMA Based Radio Access, 2009, 4 pages.
Office Action dated Oct. 17, 2017 in European Patent Application No. 14 700 125.9.

* cited by examiner

MOBILE COMMUNICATION BASE STATION AND METHOD FOR SELECTING A VIRTUAL CARRIER FOR MACHINE-TYPE COMMUNICATIONS BASED ON MEASUREMENTS OF CHANNEL CONDITIONS

CROSS-REFERENCE TO RELATED APPLICATIONS

The present application is based on PCT/GB2014/050078 filed Jan. 13, 2014, and claims priority to British Patent Application 1300809.9, filed in the UK IPO on Jan. 16, 2013, the entire contents of each of which being incorporated herein by reference.

BACKGROUND OF THE INVENTION

The present invention relates to methods and apparatus for use in wireless (mobile) telecommunications systems. In particular, embodiments of the invention relate to methods and apparatus for reporting on channel conditions in wireless telecommunications systems.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server relating to the customers consumption of a utility such as gas, water, electricity and so on. Further information on characteristics of MTC-type devices can be found, for example, in the corresponding standards, such as ETSI TS 122 368 V10.530 (2011-07)/3GPP TS 22.368 version 10.5.0 Release 10) [1]. Some typical characteristics of MTC type terminal devices/MTC type data might include, for example, characteristics such as low mobility, high delay tolerance, small data transmissions, infrequent transmission and group-based features, policing and addressing.

Whilst it can be convenient for a terminal such as an MTC type terminal to take advantage of the wide coverage area provided by a third or fourth generation mobile telecommunication network there are at present disadvantages. Unlike a conventional third or fourth generation terminal device such as a smartphone, an MTC-type terminal is preferably relatively simple and inexpensive and able to operate on relatively low resources (e.g. low power consumption). The type of functions performed by the MTC-type terminal (e.g. collecting and reporting back data) do not require particularly complex processing to perform, and furthermore are typically not time-critical. However, third and fourth generation mobile telecommunication networks typically employ advanced data modulation techniques on the radio interface which can be power hungry and require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices able to operate with low resource usage to communicate using LTE type networks. To this end, so-called "virtual carriers" have been proposed.

Some characteristics of virtual carriers are discussed in more detail further below. However, in brief summary, certain classes of devices, such as MTC devices, may support communication applications that are characterised by the transmission of small amounts of data at relatively infrequent intervals and can thus be considerably less complex than conventional LTE devices. Typical LTE communications devices may include a high-performance receiver unit capable of receiving and processing data from an LTE downlink frame across the full carrier bandwidth. However, such receiver units can be overly complex for a device which only needs to transmit or to receive small amounts of data. This may therefore limit the practicality of a widespread deployment of reduced capability MTC type devices in an LTE network. It has therefore been proposed to provide reduced capability devices such as MTC devices with a simpler receiver unit which is more proportionate with the amount of data likely to be transmitted to the device. Furthermore, as explained above it is desirable to include features in a mobile communications network and/or communications devices which can conserve power consumption of the communications devices.

In conventional mobile telecommunication networks, data is typically transmitted from the network to the communications devices in a frequency carrier (first frequency range) where at least part of the data might span substantially the whole of the bandwidth of the frequency carrier. Normally a communications device cannot operate within the network unless it can receive and decode data spanning the entire frequency carrier, i.e. a maximum system bandwidth defined by a given telecommunication standard, and therefore the use of communications devices with reduced bandwidth capability transceiver units can in effect be precluded from operating with such a carrier.

However, in accordance with the previously proposed virtual carrier concepts, a subset of the communications resource elements comprising a conventional carrier (a "host carrier") are defined as a "virtual carrier", where the host carrier has a certain bandwidth (first frequency range) and where the virtual carrier has a reduced bandwidth (second frequency range) compared to the host carrier's bandwidth. Data for reduced capability devices is separately transmitted on the virtual carrier set of communications resource elements. Accordingly, data transmitted on the virtual carrier can be received and decoded using a reduced complexity or capability transceiver unit (i.e. one with a transceiver having a narrower operating bandwidth than would otherwise be required to operate in the network).

Devices provided with reduced complexity or capability transceiver units (hereafter referred to as "reduced capability devices") could operate by using a part of its full capability (i.e. reduced capability set of its full capability) or they could be constructed to be less complex and less expensive than conventional LTE type devices (onwards referred to generally as legacy LTE devices). Accordingly, the deployment of such devices for MTC type applications within an LTE type network can become more attractive because the provision of the virtual carrier allows communications devices with less expensive and less complex transceiver units to be used.

Conventional LTE type networks allow for so-called link adaptation by a scheduler of a base station. Link adaptation allows a base station to modify its transmissions characteristics in a manner which takes account of channel conditions existing between the base station and a terminal device. For example, higher data rates may be used when channel conditions compared to when channel conditions are bad. A significant aspect of link adaptation is channel quality indicator (CQI) reporting. As is well established, a terminal device may measure the channel quality of a downlink communication and report it back to the base station as a CQI report. The base station may then perform link adaptation based on the CQI report.

Existing LTE standards provide for CQI reports with two types of bandwidth. One is known as wideband CQI and the other is known as sub-band CQI. For wideband CQI a single CQI value is established for a carrier's full bandwidth and reported to the base station. For sub-band CQI, the full bandwidth is in effect split into more than one sub-band, and a CQI value is established for each sub-band. The wideband CQI approach is simple and provides for compact signalling whereas the sub-band CQI approach can allow a scheduler to take account of frequency selective channel conditions (e.g. frequency-dependent fading).

The inventors have recognised that particular considerations might apply when considering channel conditions, for example through CQI measurement and reporting, in the context of virtual carriers. In principle a terminal device operating on a virtual carrier can implement CQI measurement and reporting within the virtual carrier in accordance with the same principles as used for conventional CQI measurement and reporting within a conventional carrier. However, in accordance with virtual carrier techniques there is in principle the possibility of a base station scheduler moving a virtual carrier from one frequency band to another, for example because the existing virtual carrier frequency band is subject to poor channel conditions. However, there is currently no mechanism for providing a base station scheduler with information to allow the base station scheduler to determine whether or not it would be appropriate to move a virtual carrier from one frequency to another.

There is therefore a desire to provide for improved schemes for reporting on channel conditions in wireless telecommunications systems.

SUMMARY OF THE INVENTION

According to a first aspect of the invention there is provided a method of operating a terminal device in a wireless telecommunications system comprising a base station arranged to communicate with a plurality of terminal devices using frequencies spanning a system frequency bandwidth, wherein the terminal device comprises a tuneable transceiver configured to receive downlink transmissions from the base station using a restricted frequency bandwidth which is smaller than and within the system frequency bandwidth, and wherein the method comprises: sequentially tuning the transceiver to different frequency locations for the restricted frequency bandwidth within the system frequency bandwidth and making measurements of channel conditions at the different frequency locations to provide a corresponding plurality of measurements of channel conditions; and communicating information derived from the plurality of measurements of channel conditions to the base station.

In accordance with some embodiments the different frequency locations for the restricted frequency bandwidth within the system frequency bandwidth comprise a plurality of predefined frequency locations.

In accordance with some embodiments the measurements of channel conditions comprise measurements of noise and/or measurements of interference.

In accordance with some embodiments the information communicated to the base station comprises an indication of at least a subset of the plurality of measurements of channel conditions.

Some embodiments further comprise the terminal device selecting a preferred frequency location for the restricted frequency bandwidth within the system frequency bandwidth based on the plurality of measurements of channel conditions.

In accordance with some embodiments the information communicated to the base station comprises an indication of the preferred frequency location for the restricted frequency bandwidth within the system frequency bandwidth.

In accordance with some embodiments the information communicated to the base station further comprises an indication of a measurement of channel conditions for the preferred frequency location for the restricted frequency bandwidth within the system frequency bandwidth.

In accordance with some embodiments the information communicated to the base station comprises an indication of locations for the restricted frequency bandwidth within the system frequency bandwidth associated with measurements of channel conditions meeting a predefined criterion.

In accordance with some embodiments the information communicated to the base station comprises an indication of one or more times associated with the plurality of measurements of channel conditions.

In accordance with some embodiments the downlink radio frame structure for the wireless telecommunications system comprises a series of time slots and the measurements of channel conditions for different frequency locations are made in different time slots.

In accordance with some embodiments consecutive measurements of channel conditions for different frequency locations are made in non-consecutive time slots.

In accordance with some embodiments the information derived from the plurality of measurements of channel conditions is communicated to the base station with signalling on a layer which is higher than a physical layer.

In accordance with some embodiments the information derived from the plurality of measurements of channel conditions is communicated to the base station with radio resource control, RRC, signalling.

In accordance with some embodiments the information derived from the plurality of measurements of channel conditions is communicated to the base station with physical layer signalling.

In accordance with some embodiments the information communicated to the base station is sent in a plurality of channel condition reports corresponding with respective one of the plurality of measurements of channel conditions.

Some embodiments further comprise receiving a plurality of resource allocation messages from the base station indicating uplink transmission resources to be used for sending respective ones of the channel condition reports.

In accordance with some embodiments different ones of the plurality of resource allocation messages are received with the transceiver tuned to different frequency locations for the restricted frequency bandwidth within the system frequency bandwidth.

Some embodiments further comprise receiving from the base station an indication of the different frequency locations for the restricted frequency bandwidth within the system frequency bandwidth at which to make the plurality of measurements of channel conditions Some embodiments further comprise receiving an indication from the base station that the terminal device's transceiver should be retuned to a frequency location selected by the base station based on the information received from the terminal device.

According to a second aspect of the invention there is provided a terminal device for use in a wireless telecommunications system comprising a base station arranged to communicate with a plurality of terminal devices using frequencies spanning a system frequency bandwidth, wherein the terminal device comprises a tuneable transceiver configured to receive downlink transmissions from the base station using a restricted frequency bandwidth which is smaller than and within the system frequency bandwidth, and wherein the terminal device is configured to: sequentially tune the transceiver to different frequency locations for the restricted frequency bandwidth within the system frequency bandwidth and make measurements of channel conditions at the different frequency locations to provide a corresponding plurality of measurements of channel conditions; and to communicate information derived from the plurality of measurements of channel conditions to the base station.

According to a third aspect of the invention there is provided a method of operating a base station in a wireless telecommunications system comprising a base station arranged to communicate with a plurality of terminal devices using frequencies spanning a system frequency bandwidth, wherein the plurality of terminal devices includes a reduced capability terminal device comprising a tuneable transceiver configured to receive downlink transmissions from the base station using a restricted frequency bandwidth which is smaller than and within the system frequency bandwidth, and wherein the method comprises: receiving from the reduced capability terminal device information derived by from a plurality of measurements of channel conditions obtained by the reduced capability terminal device sequentially tuning its transceiver to different frequency locations for its restricted frequency bandwidth within the system frequency bandwidth and making measurements of channel conditions at the different frequency locations; and scheduling subsequent downlink transmissions for the reduced capability terminal device on frequencies selected in a manner which takes account of the information received from the reduced capability terminal device.

In accordance with some embodiments the different frequency locations for the restricted frequency bandwidth within the system frequency bandwidth comprise a plurality of predefined frequency locations.

In accordance with some embodiments the measurements of channel conditions comprise measurements of noise and/or measurements of interference.

In accordance with some embodiments the information received from the reduced capability terminal device comprises an indication of at least a subset of the plurality of measurements of channel conditions.

In accordance with some embodiments the information received from the reduced capability terminal device comprises an indication of a preferred frequency location for the restricted frequency bandwidth selected from within the system frequency bandwidth by the reduced capability terminal device in a manner which takes account of the plurality of measurements of channel conditions.

In accordance with some embodiments the information received from the reduced capability terminal device further comprises an indication of a measurement of channel conditions for the preferred frequency location.

In accordance with some embodiments the information received from the reduced capability terminal device comprises an indication of locations for the restricted frequency bandwidth within the system frequency bandwidth associated with measurements of channel conditions meeting a predefined criterion.

In accordance with some embodiments the information received from the reduced capability terminal device comprises an indication of one or more times associated with the plurality of measurements of channel conditions.

In accordance with some embodiments the downlink radio frame structure for the wireless telecommunications system comprises a series of time slots and the method further comprises the base station transmitting reference signalling at different times and frequencies to allow the reduced capability terminal device to make measurements of channel conditions for different frequency locations in different time slots.

Some embodiments further comprise the base station transmitting reference signalling at different times and frequencies to allow the reduced capability terminal device to make consecutive measurements of channel conditions for different frequency locations in non-consecutive time slots.

In accordance with some embodiments the information is received from the reduced capability terminal device with signalling on a layer which is higher than a physical layer.

In accordance with some embodiments the information is received from the reduced capability terminal device using radio resource control, RRC, signalling.

In accordance with some embodiments the information is received from the reduced capability terminal device with physical layer signalling.

In accordance with some embodiments the information is received from the reduced capability terminal device in a plurality of channel condition reports corresponding with respective one of the plurality of measurements of channel conditions.

Some embodiments further comprise the base station transmitting to the terminal device a plurality of resource allocation messages indicating uplink transmission resources to be by the reduced capability terminal device for sending respective ones of the channel condition reports.

In accordance with some embodiments different ones of the plurality of resource allocation messages are transmitted at different frequency locations for the reduced capability terminal device's restricted frequency bandwidth within the system frequency bandwidth.

Some embodiments further comprise transmitting to the reduced capability terminal device an indication that the reduced capability terminal device should proceed to make the measurements of channel conditions at the different frequency locations.

Some embodiments further comprise the base station transmitting an indication of the different frequency locations for the restricted frequency bandwidth within the system frequency bandwidth at which the reduced capability terminal device should make the plurality of measurements of channel conditions Some embodiments further comprise the base station transmitting an indication to the reduced capability terminal device to indicate the reduced capability terminal device should retune its transceiver to a frequency location corresponding to the frequencies selected for the subsequent downlink transmissions.

According to a fourth aspect of the invention there is provided a base station for use in a wireless telecommunications system comprising a base station arranged to communicate with a plurality of terminal devices using frequencies spanning a system frequency bandwidth, wherein the plurality of terminal devices includes a reduced capability terminal device comprising a tuneable transceiver configured to receive downlink transmissions from the base station using a restricted frequency bandwidth which is smaller than and within the system frequency bandwidth, and wherein the base station is configured to: receiving from the reduced capability terminal device information derived by from a plurality of measurements of channel conditions obtained by the reduced capability terminal device sequentially tuning its transceiver to different frequency locations for its restricted frequency bandwidth within the system frequency bandwidth and making measurements of channel conditions at the different frequency locations; and to schedule subsequent downlink transmissions for the reduced capability terminal device on frequencies selected in a manner which takes account of the information received from the reduced capability terminal device.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Embodiments of the invention may in particular be employed within the context of what might be termed "virtual carriers" operating within a bandwidth of a "host carriers". The concepts of virtual carriers are described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8], GB 1101972.6 [9], GB 1121767.6 [10] and GB 1121766.8 [11] the contents of which are incorporated herein by reference. The reader is referred to these co-pending applications for more details, but for ease of reference an overview of the concept of virtual carriers is also provided here.

Conventional Network

Figure 1:
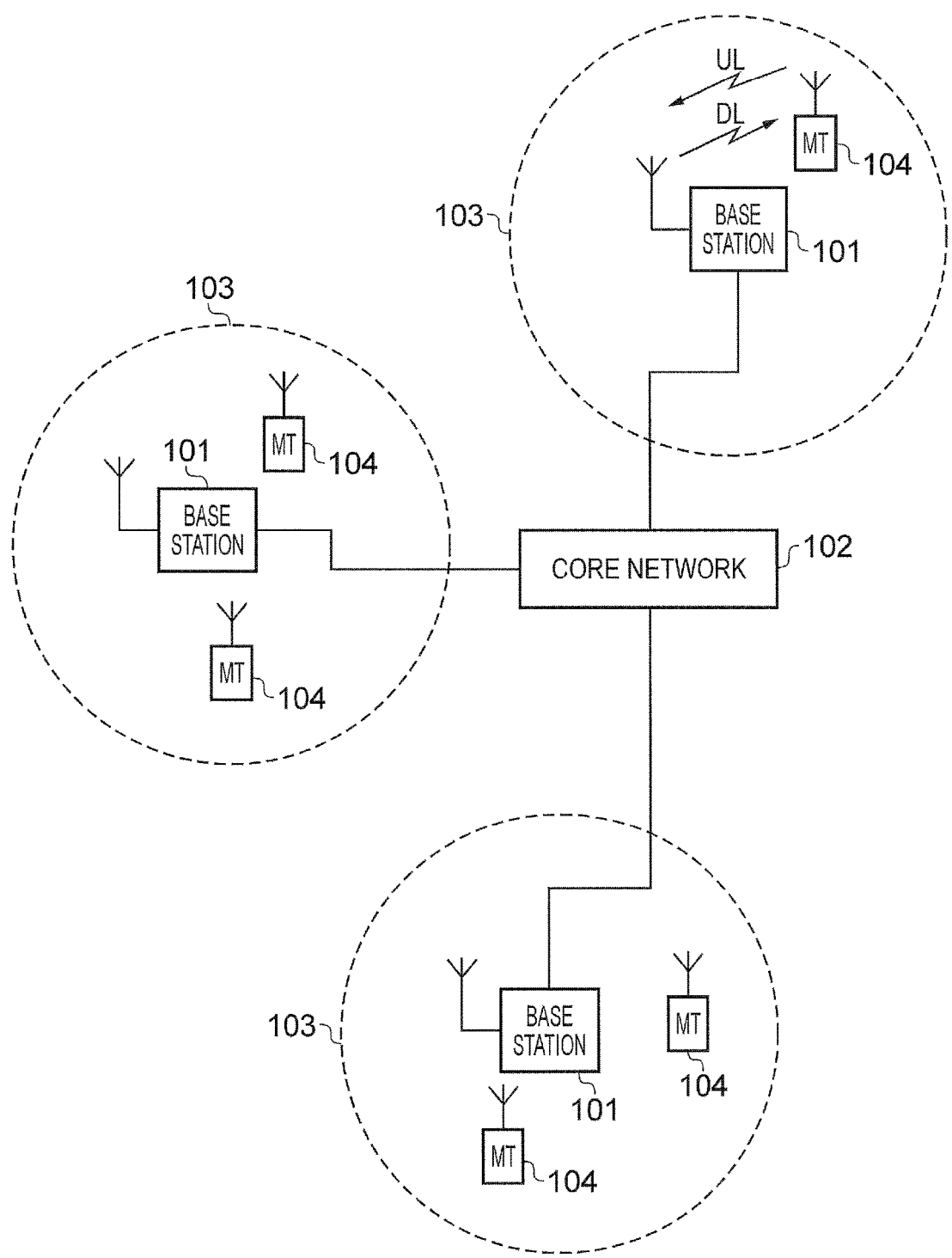
FIG. 1 provides a schematic diagram illustrating an example of a conventional mobile telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP® body and also described in many books on the subject, for example, Holma H. and Toskala A [12].

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Figure 2:
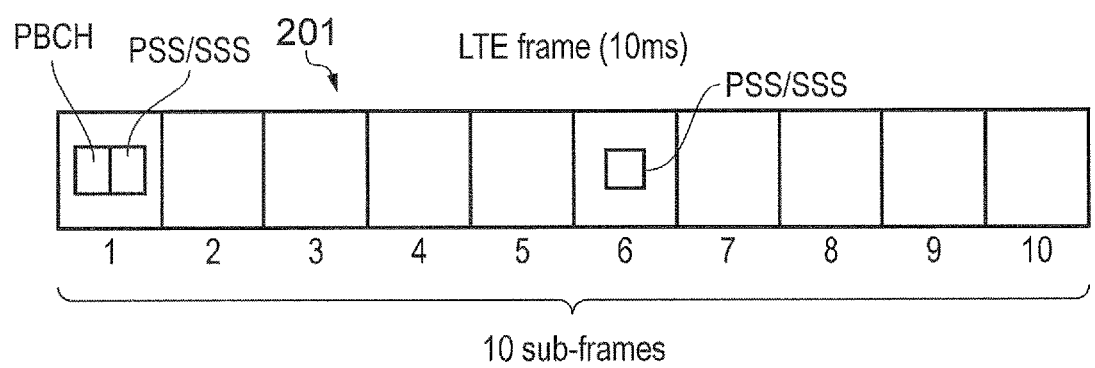
FIG. 2 provides a schematic diagram illustrating a conventional LTE radio frame.

Mobile telecommunications systems such as those arranged in accordance with the 3GPP defined Long Term Evolution (LIE) architecture use an orthogonal frequency division multiplex (OFDM) based interface for the radio downlink (so-called OFDMA) and the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A primary broadcast channel (PBCH) is transmitted in the first subframe of the LTE frame. The PSS, SSS and PBCH are discussed in more detail below.

Figure 3:
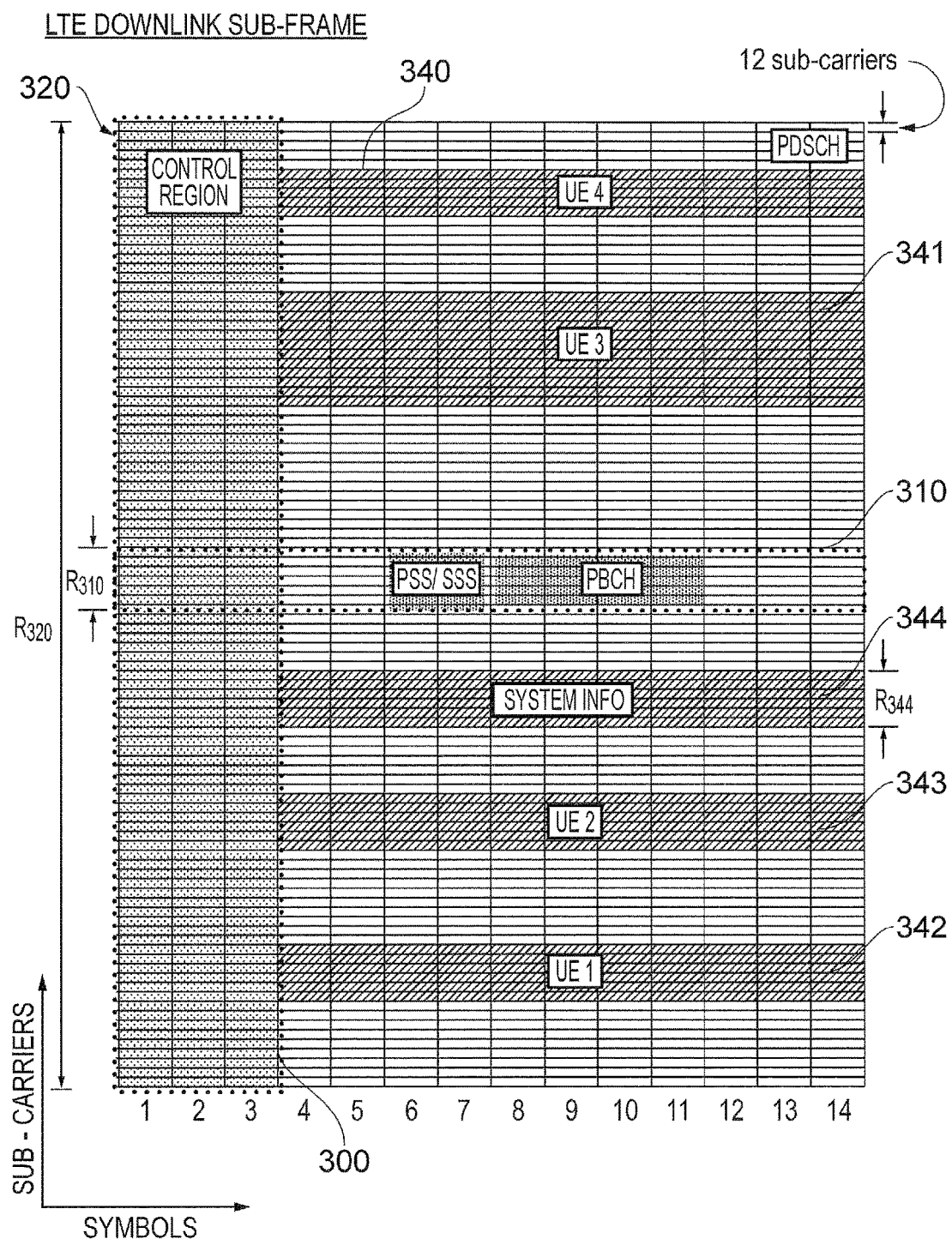
FIG. 3 provides a schematic diagram illustrating an example of a conventional LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element is not shown, instead each individual box in the subframe grid corresponds to twelve sub-carriers transmitted on one symbol.

FIG. 3 shows in hatching resource allocations for four LTE terminals 340, 341, 342, 343. For example, the resource allocation 342 for a first LTE terminal (UE1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe. Further explanation of these channels is provided below.

FIG. 3 also shows a region of PDSCH containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the subframe to provide for frequency diversity. Therefore a conventional LTE terminal must be able to receive the entire channel bandwidth in order to receive and decode the control region.

Figure 4:
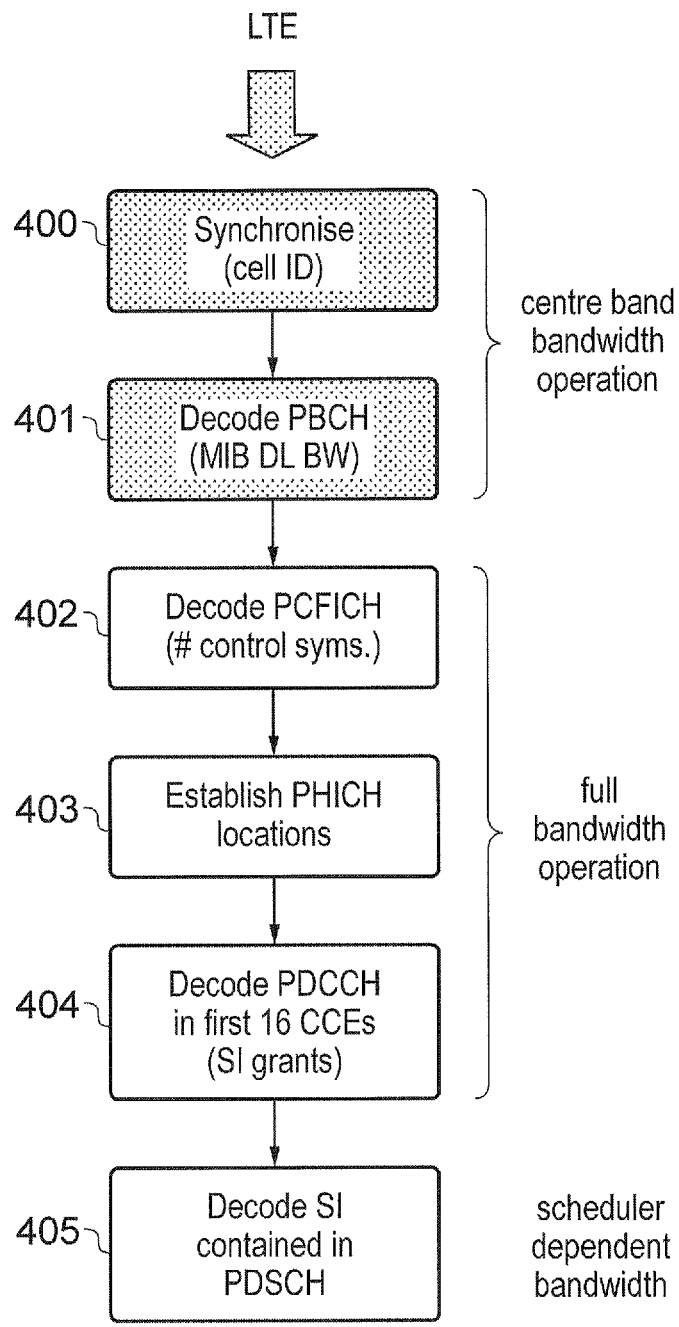
FIG. 4 provides a schematic diagram illustrating a conventional LTE "camp-on" procedure.

FIG. 4 illustrates an LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each subframe, the terminal then decodes the PCFICH which is distributed across the entire bandwidth of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At the PCFICH decoding stage, with a 20 MHz carrier band, the terminal operates at a much larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its resource allocations. The resource allocations are used by the terminal to locate system information and to locate its data in the PDSCH as well as to be informed of any transmission resources it has been granted on PUSCH. Both system information and UE-specific resource allocations are transmitted on PDSCH and scheduled within the carrier band 320. Steps 403 and 404 also require the terminal to operate on the entire bandwidth R320 of the carrier band.

At steps 402 to 404, the terminal decodes information contained in the control region 300 of a subframe. As explained above, in LTE, the three control channels mentioned above (PCFICH, PHICH and PDCCH) can be found across the control region 300 of the carrier where the control region extends over the range $R_{320}$ and occupies the first one, two or three OFDM symbols of each subframe as discussed above. In a subframe, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in an LTE subframe the PDSCH generally occupies groups of resource elements which are neither in the control region nor in the resource elements occupied by PSS, SSS or PBCH. The data in the blocks of resource elements 340, 341, 342, 343 allocated to the different mobile communication terminals (UEs) shown in FIG. 3 have a smaller bandwidth than the bandwidth of the entire carrier, although to decode these blocks a terminal first receives the PDCCH spread across the frequency range $R_{320}$ to determine if the PDCCH indicates that a PDSCH resource is allocated to the UE and should be decoded. Once a UE has received the entire subframe, it can then decode the PDSCH in the relevant frequency range (if any) indicated by the PDCCH. So for example, UE 1 discussed above decodes the whole control region 300 and then the data in the resource block 342.

Virtual Downlink Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE terminals. In many scenarios, providing low capability terminals such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal. As set out below, in accordance with some examples of the present invention a "virtual carrier" is provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

Figure 5:
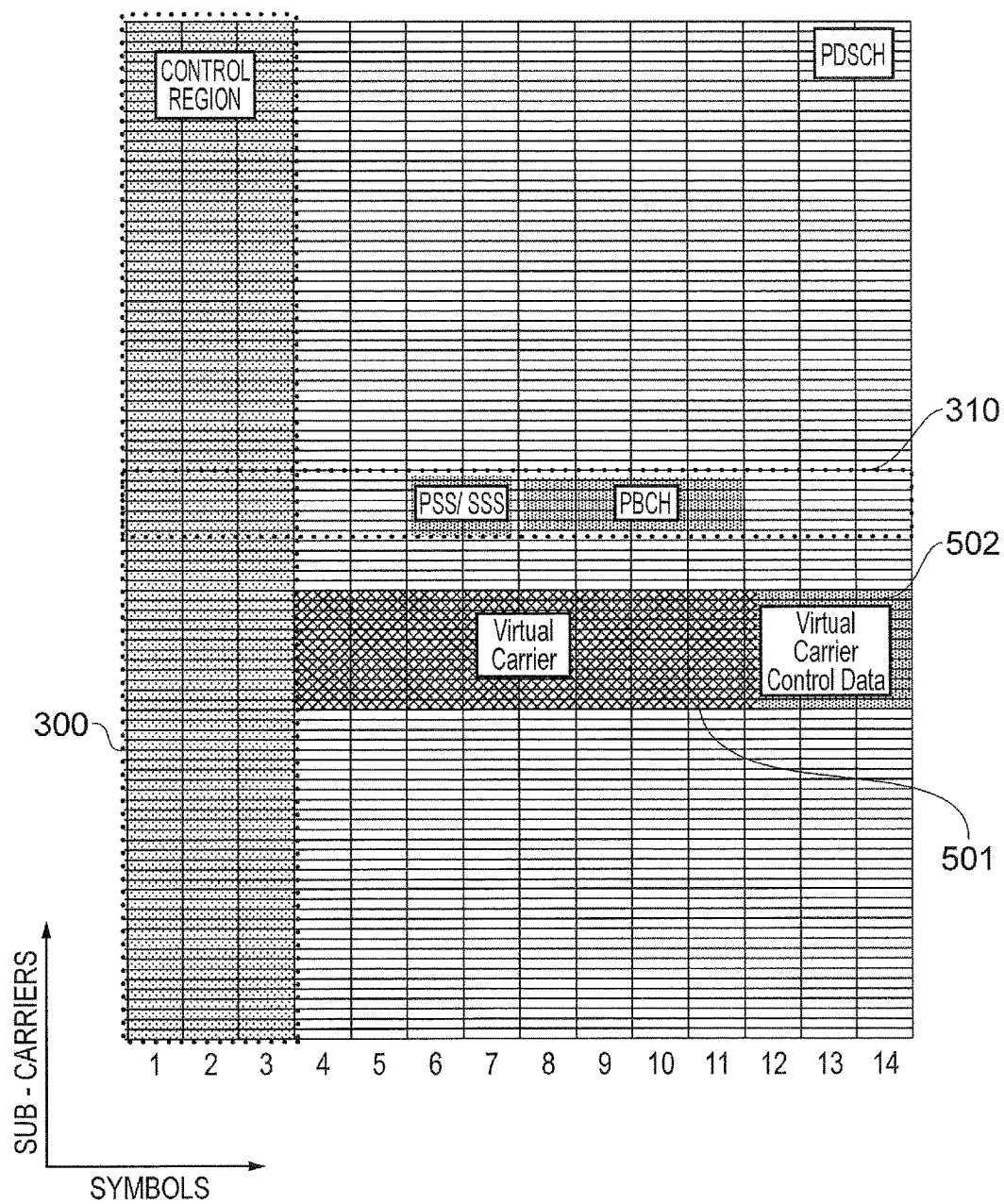
FIG. 5 provides a schematic diagram illustrating an LTE downlink radio subframe in which a virtual carrier has been inserted.

FIG. 5 provides a schematic diagram illustrating an LTE downlink subframe which includes a virtual carrier inserted in a host carrier.

In keeping with a conventional LTE downlink subframe, the first n symbols (n is three in FIG. 5) form the control region 300 which is reserved for the transmission of downlink control data such as data transmitted on the PDCCH. However, as can be seen from FIG. 5, outside of the control region 300 the LTE downlink subframe includes a group of resource elements positioned in this example below the central band 310 which form a virtual carrier 501. As explained further below, the virtual carrier 501 is adapted so that data transmitted on the virtual carrier 501 can be treated as logically distinct from data transmitted in the remaining parts of the host carrier and can be decoded without decoding all the control data from the control region 300. Although FIG. 5 shows the virtual carrier occupying frequency resources below the centre band, in general the virtual carrier can occupy other frequency resources, for example, above the centre band or including the centre band. If the virtual carrier is configured to overlap any resources used by the PSS, SSS or PBCH of the host carrier, or any other signal transmitted by the host carrier that a terminal device operating on the host carrier would require for correct operation and expect to find in a known pre-determined location, the signals on the virtual carrier can be arranged such that these aspects of the host carrier signal are maintained.

As can be seen from FIG. 5, data transmitted on the virtual carrier 501 is transmitted across a limited bandwidth. This might be any suitable bandwidth smaller than that of the host carrier. In the example shown in FIG. 5 the virtual carrier is transmitted across a bandwidth comprising 12 blocks of 12 sub-carriers (i.e. 144 sub-carriers), which is equivalent to a 2.16 MHz transmission bandwidth. Accordingly, a terminal using the virtual carrier need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

As explained above, in OFDM-based mobile communication systems such as LTE, downlink data is dynamically assigned to be transmitted on different sub-carriers on a subframe by subframe basis. Accordingly, in every subframe the network signals which sub-carriers on which symbols contain data relevant to which terminals (i.e. downlink allocation signalling).

As can be seen from FIG. 3, in a conventional downlink LTE subframe this information is transmitted on the PDCCH during the first symbol or symbols of the subframe. However, as previously explained, the information transmitted in the PDCCH is spread across the entire bandwidth of the subframe and therefore cannot be received by a mobile communication terminal with a simplified receiver unit capable only of receiving the reduced bandwidth virtual carrier.

Accordingly, as can be seen in FIG. 5, the final symbols of the virtual carrier can be reserved as a control region 502 for the virtual carrier for the transmission of control data indicating which resource elements of the virtual carrier 501 have been allocated to user equipment (UEs) using the virtual carrier. In some examples the number of symbols comprising the virtual carrier control region 502 might be fixed, for example three symbols. In other examples the virtual carrier control region 502 can vary in size, for example between one and three symbols, as with the control region 300.

The virtual carrier control region can be located at any suitable position, for example in the first few symbols of the virtual carrier. In the example of FIG. 5 this could mean positioning the virtual carrier control region on the fourth, fifth and sixth symbols. However, fixing the position of the virtual carrier control region in the final symbols of the subframe can be useful because the position of the virtual carrier control region will not vary in dependence on the number of symbols of the host carrier control region 300. This can help simplify the processing undertaken by mobile communication terminals receiving data on the virtual carrier because there is no need for terminals to determine a position of the virtual carrier control region every subframe if it is known that it will always be positioned in the final n symbols of the subframe.

In a further embodiment, the virtual carrier control symbols may reference virtual carrier PDSCH transmissions in a separate subframe.

In some examples the virtual carrier may be located within the centre band 310 of the downlink subframe. This can help reduce the impact on host carrier PDSCH resources caused by the introduction of the virtual carrier within the host carrier bandwidth since the resources occupied by the PSS/SSS and PBCH would be contained within the virtual carrier region and not the remaining host carrier PDSCH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

Virtual Carrier "Camp-On" Process

As explained above, before a conventional LTE terminal can begin transmitting and receiving data in a cell, it first camps on to the cell. An adapted camp-on process can be provided for terminals using the virtual carrier.

Figure 6:
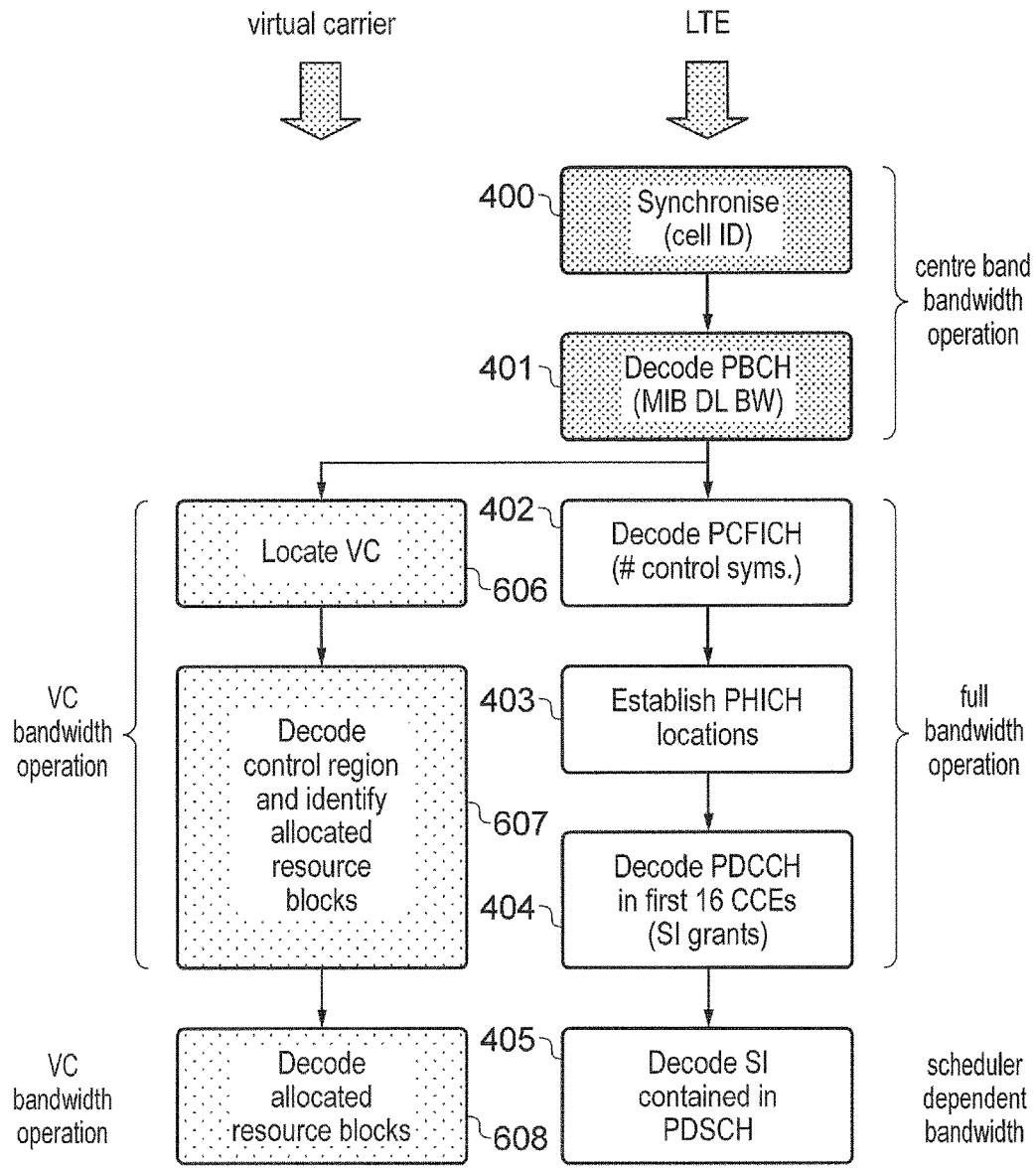
FIG. 6 provides a schematic diagram illustrating an adapted LTE "camp-on" procedure for camping on to a virtual carrier.

FIG. 6 shows a flow diagram schematically illustrating a camp-on process. There are two branches shown in FIG. 6. Different steps of the process associated with a UE intending to use the virtual carrier are shown under the general heading "virtual carrier". The steps shown under the general heading "legacy LTE" are associated with a UE intending to use the host carrier, and these steps correspond to the steps of FIG. 4. In this example, the first two steps 400, 401 of the camp-on procedure are common to both the virtual carrier and host (legacy LTE) carrier.

The virtual carrier camp-on process is explained with reference to the example subframe shown in FIG. 5 in which a virtual carrier with a bandwidth of 144 sub-carriers is inserted within the operating bandwidth of a host carrier with a bandwidth corresponding to 1200 sub-carriers. As discussed above, a terminal having a receiver unit with an operational bandwidth of less than that of the host carrier cannot fully decode data in the control region of subframes of the host carrier. However, a receiver unit of a terminal having an operational bandwidth of only twelve blocks of twelve sub-carriers (i.e. 2.16 MHz) can receive control and user data transmitted on this example virtual carrier 502.

As noted above, in the example of FIG. 6, the first steps 400 and 401 for a virtual carrier terminal are the same as the conventional camp-on process shown in FIG. 4, although a virtual carrier terminal may extract additional information from the MIB as described below. Both types of terminals (i.e. virtual carrier terminals and host/legacy carrier terminals) can use the PSS/SSS and PBCH to synchronize with the base station using the information carried on the 72 sub-carrier centre band within the host carrier. However, where the conventional LTE terminals then continue with the process by performing the PCFICH decoding step 402, which requires a receiver unit capable of receiving and decoding the host carrier control region 300, a terminal camping on to the cell to receive data on the virtual carrier (which may be referred to as a "virtual carrier terminal") performs steps 606 and 607 instead.

In a further example a separate synchronisation and PBCH functionality can be provided for the virtual carrier device as opposed to re-using the same conventional initial camp-on processes of steps 400 and 401 of the host carrier device.

Figure 7:
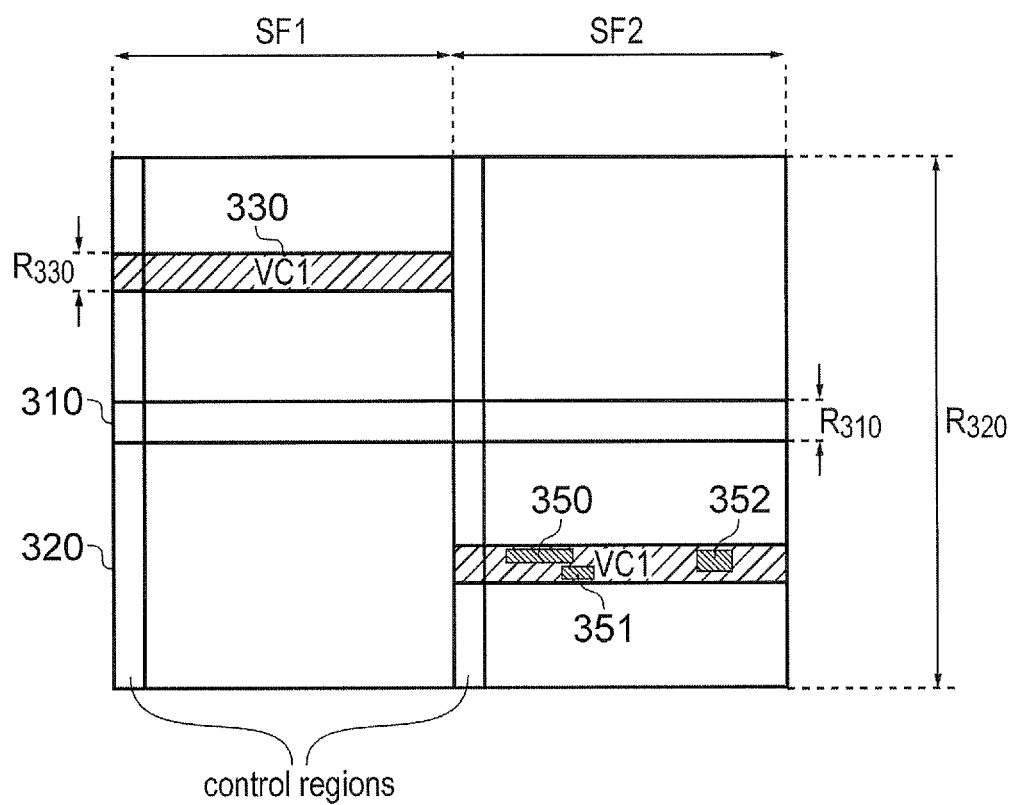
FIG. 7 provides a schematic diagram illustrating LTE downlink radio subframes.

At step 606, the virtual carrier terminal locates a virtual carrier, if any is provided within the host carrier, using a virtual carrier-specific step. Various examples of how this step may be performed are discussed further below. Once the virtual carrier terminal has located a virtual carrier, it can access information within the virtual carrier. For example, if the virtual carrier mirrors the conventional LTE resource allocation method, the virtual carrier terminal may proceed to decode control portions within the virtual carrier, which can, for example, indicate which resource elements within the virtual carrier have been allocated for a specific virtual carrier terminal or for system information. For example, FIG. 7 shows the blocks of resource elements 350 to 352 within virtual carrier 330 that have been allocated for the subframe SF2. However, there is no requirement for the virtual carrier terminal to follow or mirror the conventional LTE process (e.g. steps 402-404) and these steps may for example be implemented very differently for a virtual carrier camp-on process.

Regardless of the virtual carrier terminal following a LTE-like step or a different type of step when performing step 607, the virtual carrier terminal can then decode the allocated resource elements at step 608 and thereby receive data transmitted by the base station broadcasting the virtual carrier. The data decoded in step 608 may include, for example, the remainder of the system information containing details of the network configuration.

Even though the virtual carrier terminal does not have the bandwidth capabilities to decode and receive downlink data if it was transmitted in the host carrier using conventional LTE, it can still access a virtual carrier within the host carrier having a limited bandwidth whilst re-using the initial LTE steps. Step 608 may also be implemented in a LTE-like manner or in a different manner. For example, multiple virtual carrier terminals may share a virtual carrier and have grants allocated to manage the virtual carrier sharing as shown in SF2 in FIG. 7, or, in another example, a virtual carrier terminal may have the entire virtual carrier allocated for its own downlink transmissions, or the virtual carrier may be entirely allocated to a virtual carrier terminal for a certain number of subframe only, etc.

There is thus a large degree of flexibility provided for the virtual carrier camp-on process. There is, for example, the ability to adjust a balance between re-using or mirroring conventional LTE steps or processes, thereby reducing the terminal complexity and the need to implement new elements, and adding new virtual carrier specific aspects or implementations, thereby potentially optimizing the use of narrow-band virtual carriers, as LTE has been designed with the larger-band host carriers in mind.

Downlink Virtual Carrier Detection

As discussed above, the virtual carrier terminal should locate (within the time-frequency resource grid of the host carrier) the virtual carrier before it can receive and decode transmissions on the virtual carrier. Several alternatives are available for the virtual carrier presence and location determination, which can be implemented separately or in combination. Some of these options are discussed below.

To facilitate the virtual carrier detection, the virtual carrier location information may be provided to the virtual carrier terminal such that it can locate the virtual carrier, if any exists, more easily. For example, such location information may comprise an indication that one or more virtual carriers are provided within the host carrier, or that the host carrier does not currently provide any virtual carrier. It may also comprise an indication of the virtual carrier's bandwidth, for example in MHz or blocks of resource elements. Alternatively, or in combination, the virtual carrier location information may comprise the virtual carrier's centre frequency and bandwidth, thereby giving the virtual carrier terminal the location and bandwidth of any active virtual carrier. In the event the virtual carrier is to be found at a different frequency position in each subframe, according, for example, to a pseudo-random hopping algorithm, the location information can, for example, indicate a pseudo random parameter. Such parameters may include a starting frame and parameters used for the pseudo-random algorithm. Using these pseudo-random parameters, the virtual carrier terminal can then know where the virtual carrier can be found for any subframe.

Figure 8:
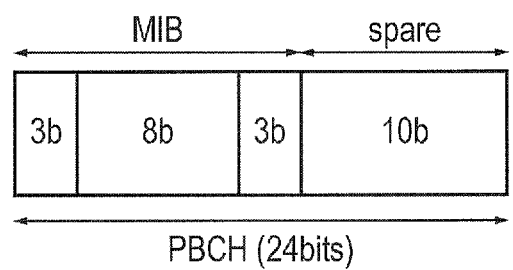
FIG. 8 provides a schematic diagram illustrating a physical broadcast channel (PBCH)
Figure 9:
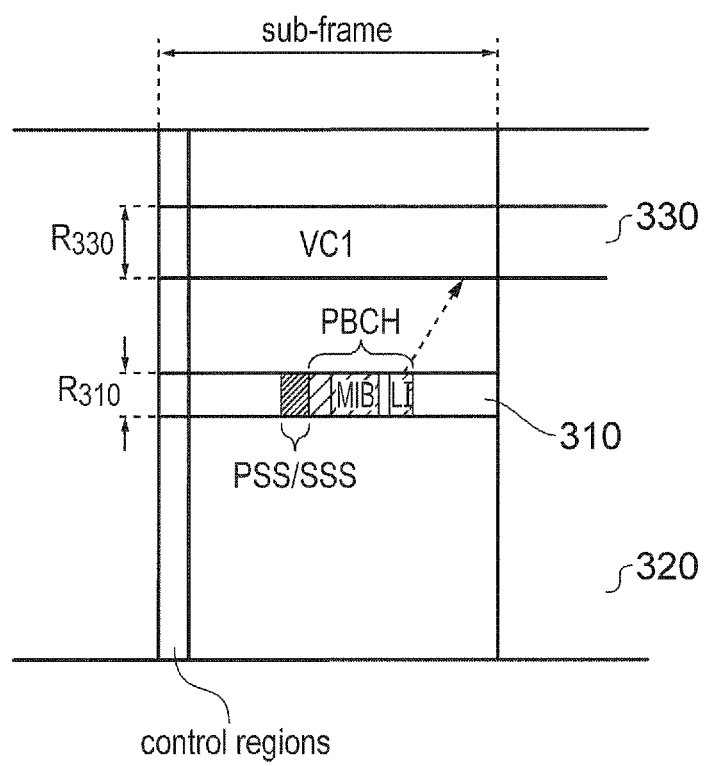
FIG. 9 provides a schematic diagram illustrating an LTE downlink radio subframe.

On implementation feature associated with little change to the virtual carrier terminal (as compared with a conventional LTE terminal) would be to include location information for the virtual carrier within the PBCH, which already carries the Master Information Block, or MIB in the host carrier centre band. As shown in FIG. 8, the MB consists of 24 bits (3 bits to indicate DL bandwidth, 8 bits to indicate the System Frame Number or SFN, and 3 bits regarding the PHICH configuration). The MIB therefore comprises 10 spare bits that can be used to carry location information in respect of one or more virtual carriers. For example, FIG. 9 shows an example where the PBCH includes the MIB and location information ("LI") for pointing any virtual carrier terminal to a virtual carrier.

Alternatively, virtual carrier location information could be provided in the centre band, outside of the PBCH. It can for example be always provided after and adjacent to the PBCH. By providing the location information in the centre band but outside of the PBCH, the conventional PBCH is not modified for the purpose of using virtual carriers, but a virtual carrier terminal can easily find the location information in order to detect the virtual carrier, if any.

The virtual carrier location information, if provided, can be provided elsewhere in the host carrier, but it may be advantageous to provide it in the centre band, for example because a virtual carrier terminal may configure its receiver to operate on the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal could then scan the host carrier for a virtual carrier (e.g. performing a so-called blind search process). Scanning the host carrier for a virtual carrier can be based on different approaches, some of which will be presented below.

Figure 10:
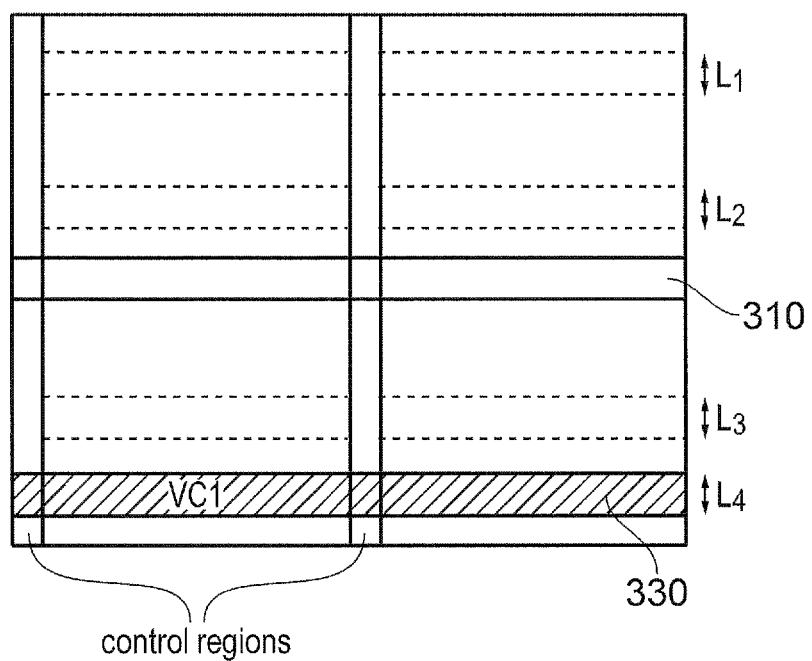
FIG. 10 provides a schematic diagram illustrating an LTE downlink radio subframe in which a virtual carrier has been inserted.

According to a first approach, a virtual carrier might only be inserted in certain pre-determined locations, as illustrated for example in FIG. 10 for a four-location example. The virtual carrier terminal then scans the four locations L1-L4 for any virtual carrier. If and when the virtual carrier terminal detects a virtual carrier, it can then "camp-on" to the virtual carrier to receive downlink data as described above. In this approach, the virtual carrier terminal may be provided with the possible virtual carrier locations in advance, for example they may be stored as a network-specific setting in an internal memory. Detection of a virtual carrier could be accomplished by seeking to decode a particular physical channel on the virtual carrier. The successful decoding of such a channel, indicated for example by a successful cyclic redundancy check (CRC) on decoded data, would indicate the successful location of the virtual carrier.

Figure 11A:
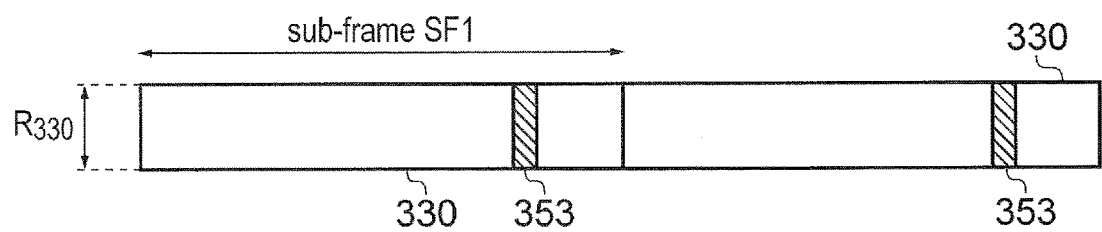
FIGS. 11A to 11D provide schematic diagrams illustrating positioning of location signals within a LTE downlink subframe.
Figure 11B:
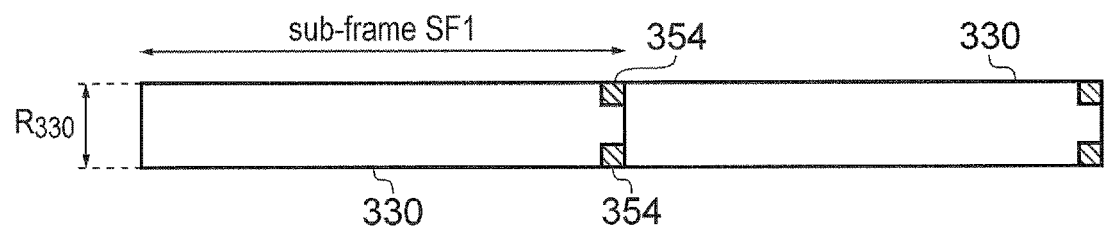
Figure 11C:
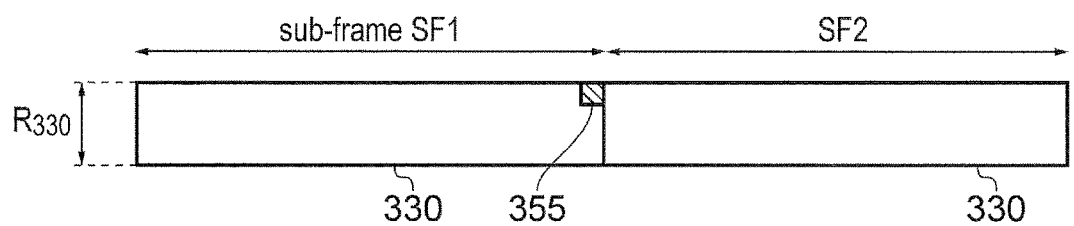

According to a second approach, the virtual carrier may include location signals such that a virtual carrier terminal scanning the host carrier can detect such signals to identify the presence of a virtual carrier. Examples of possible location signals are illustrated in FIGS. 11A to 11D. In the examples of FIGS. 11A to 11C, the virtual carrier regularly sends an arbitrary location signal such that a terminal scanning a frequency range where the location signal is would detect this signal. An "arbitrary" signal is intended here to include any signal that does not carry any information as such, or is not meant to be interpreted, but merely includes a specific signal or pattern that a virtual carrier terminal can detect. This can for example be a series of positive bits across the entire location signal, an alternation of 0 and 1 across the location signal, or any other suitable arbitrary signal. It is noteworthy that the location signal may be made of adjacent blocks of resource elements or may be formed of non-adjacent blocks. For example, it may be located at every other block of resource elements at the "top" (i.e. upper frequency limit) of the virtual carrier.

In the example of FIG. 11A, the location signal 353 extends across the range $R_{330}$ of the virtual carrier 330 and is always found at the same position in the virtual carrier within a subframe. If the virtual carrier terminal knows where to look for a location signal in a virtual carrier subframe, it can then simplify its scanning process by only scanning this position within a subframe for a location signal. FIG. 11B shows a similar example where every subframe includes a location signal 354 comprising two parts: one at the top corner and one at the bottom corner of the virtual carrier subframe, at the end of this subframe. Such a location signal may be useful if, for example, the virtual carrier terminal does not know the bandwidth of the virtual carrier in advance as it can facilitate a clear detection of the top and bottom frequency edges of the virtual carrier band.

In the example of FIG. 11C, a location signal 355 is provided in a first subframe SF1, but not in a second subframe SF2. The location signal can for example be provided every two subframes. The frequency of the location signals can be chosen to adjust a balance between reducing scanning time and reducing overhead. In other words, the more often the location signal is provided, the less long it takes a terminal to detect a virtual carrier but the more overhead there is.

Figure 11D:
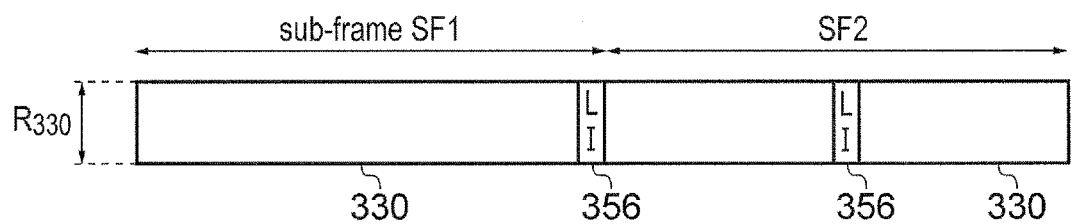

In the example of FIG. 11D, a location signal is provided where this location signal is not an arbitrary signal as in FIGS. 11A to 11C, but is a signal that includes information for virtual carrier terminals. The virtual carrier terminals can detect this signal when they scan for a virtual carrier and the signal may include information in respect of, for example, the virtual carrier bandwidth or any other virtual carrier-related information (location or non-location information). When detecting this signal, the virtual carrier terminal can thereby detect the presence and location of the virtual carrier. As shown in FIG. 11D, the location signal can, like an arbitrary location signal, be found at different locations within the subframe, and the location may vary on a per-subframe basis.

Dynamic Variation of Control Region Size of Host Carrier

As explained above, in LTE the number of symbols that make up the control region of a downlink subframe varies dynamically depending on the quantity of control data that needs to be transmitted. Typically, this variation is between one and three symbols. As will be understood with reference to FIG. 5, variation in the width of the host carrier control region will cause a corresponding variance in the number of symbols available for the virtual carrier. For example, as can be seen in FIG. 5, when the control region is three symbols in length and there are 14 symbols in the subframe, the virtual carrier is eleven symbols long. However, if in the next subframe the control region of the host carrier were reduced to one symbol, there would be thirteen symbols available for the virtual carrier in that subframe.

When a virtual carrier is inserted into a LTE host carrier, mobile communication terminals receiving data on the virtual carrier need to be able to determine the number of symbols in the control region of each host carrier subframe to determine the number of symbols in the virtual carrier in that subframe if they are to be able to use all available symbols that are not used by the host carrier control region.

Conventionally, the number of symbols forming the control region is signalled in the first symbol of every subframe in the PCFICH. However, the PCFICH is typically distributed across the entire bandwidth of the downlink LTE subframe and is therefore transmitted on sub-carriers which virtual carrier terminals capable only of receiving the virtual carrier cannot receive. Accordingly, in one embodiment, any symbols across which the control region could possibly extend are predefined as null symbols on the virtual carrier, i.e. the length of the virtual sub-carrier is set at (m-n) symbols, where m is the total number of symbols in a subframe and n is the maximum number of symbols of the control region. Thus, resource elements are never allocated for downlink data transmission on the virtual carrier during the first n symbols of any given subframe.

Although this embodiment is simple to implement it will be spectrally inefficient because during subframes when the control region of the host carrier has fewer than the maximum number of symbols, there will be unused symbols in the virtual carrier.

In another embodiment, the number of symbols in the control region of the host carrier is explicitly signalled in the virtual carrier itself. Once the number of symbols in the control region of the host carrier is known, the number of symbols in the virtual carrier can be calculated by subtracting the total number of symbols in the subframe from this number.

In one example an explicit indication of the host carrier control region size is given by certain information bits in the virtual carrier control region. In other words an explicit signalling message is inserted at a predefined position in the virtual carrier control region 502. This predefined position is known by each terminal adapted to receive data on the virtual carrier.

In another example, the virtual carrier includes a predefined signal, the location of which indicates the number of symbols in the control region of the host carriers. For example, a predefined signal could be transmitted on one of three predetermined blocks of resource elements. When a terminal receives the subframe it scans for the predefined signal. If the predefined signal is found in the first block of resource elements this indicates that the control region of the host carrier comprises one symbol; if the predefined signal is found in the second block of resource elements this indicates that the control region of the host carrier comprises two symbols and if the predefined signal is found in the third block of resource elements this indicates that the control region of the host carrier comprises three symbols.

In another example, the virtual carrier terminal is arranged to first attempt to decode the virtual carrier assuming that the control region size of the host carrier is one symbol. If this is not successful, the virtual carrier terminal attempts to decode the virtual carrier assuming that the control region size of the host carrier is two and so on, until the virtual carrier terminal successfully decodes the virtual carrier.

Downlink Virtual Carrier Reference Signals

As is known in the art, in OFDM-based transmission systems, such as LTE, a number of sub-carriers in symbols throughout the subframes are typically reserved for the transmission of reference signals. Reference signals are conventionally transmitted on sub-carriers distributed throughout a subframe across the channel bandwidth and across the OFDM symbols. The reference signals are arranged in a repeating pattern and can be used by a receiver to estimate downlink channel conditions. These reference signals are also typically used for additional purposes such as determining metrics for received signal power indications, automatic frequency control metrics and automatic gain control metrics. In LTE the positions of the reference signal bearing sub-carriers within each subframe are predetermined and known at the transceiver of each terminal.

In a conventional LTE downlink subframes, there are a number of different reference signals, transmitted for different purposes. One example is the cell-specific reference signal, broadcast to all terminals. Cell-specific reference symbols are typically inserted on every sixth sub-carrier on each transmit antenna port on which they occur. Accordingly, if a virtual carrier is inserted in an LTE downlink subframe, even if the virtual carrier has a minimum bandwidth of one resource block (i.e. twelve sub-carriers) the virtual carrier will include at least some cell-specific reference signal bearing sub-carriers.

There are sufficient reference signal bearing sub-carriers provided in each subframe such that a receiver need not accurately receive every single reference signal to decode the data transmitted in the subframe. However, as will be understood the more reference signals that are received, the better a receiver will generally be able to estimate the channel response, and hence fewer errors will typically be introduced into the data decoded from the subframe. Accordingly, in order to preserve compatibility with LTE communication terminals receiving data on the host carrier, in accordance with some example virtual carrier implementations, the sub-carrier positions that would contain reference signals in a conventional LTE subframe are retained in the virtual carrier. These reference symbols can be used by terminal devices operating on the virtual carrier for the purpose of measuring channel conditions on the virtual carrier in what is in effect the same way in which conventional (legacy) terminal devices can use the reference symbols for the purpose of measuring channel conditions on the host carrier.

As will be understood, terminals arranged to receive only the virtual carrier receive a reduced number of sub-carriers compared to conventional LTE terminals which receive each subframe across the entire bandwidth of the subframe. As a result, the reduced capability terminals receive fewer reference signals over a narrower range of frequencies which may result in a less accurate channel estimation being generated.

In some examples a simplified virtual carrier terminal may have a lower mobility which requires fewer reference symbols to support channel estimation. However, in some examples the downlink virtual carrier may include additional reference signal bearing sub-carriers to enhance the accuracy of the channel estimation (channel condition measurements) that the reduced capability terminals can generate (i.e. there may be a greater density of reference symbols on the virtual carrier as compared to other regions on the host carrier).

In some examples the positions of additional reference bearing sub-carriers are such that they are systematically interspersed with respect to the positions of the conventional reference signal bearing sub-carriers thereby increasing the sampling frequency of the channel estimation when combined with the reference signals from the existing reference signal bearing sub-carriers. This allows an improved channel estimation of the channel to be generated by the reduced capability terminals across the bandwidth of the virtual carrier. In other examples, the positions of the additional reference bearing sub-carriers are such that they are systematically placed at the edge of the bandwidth of the virtual carrier thereby increasing the interpolation accuracy of the virtual carrier channel estimates.

Alternative Virtual Carrier Arrangements

Figure 12:
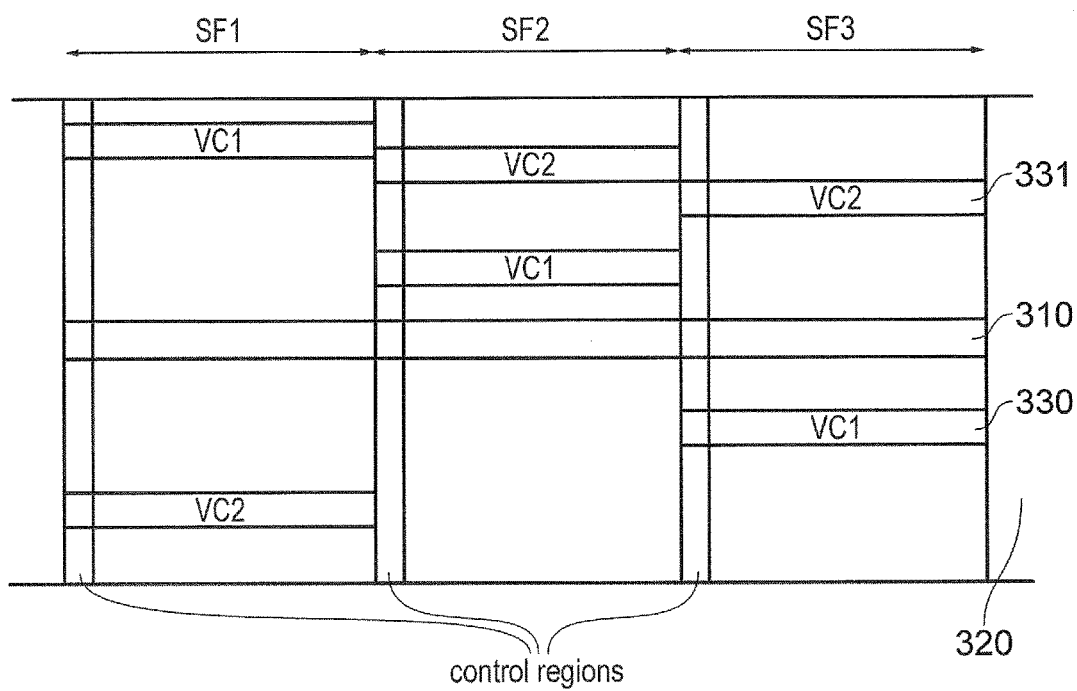
FIG. 12 provides a schematic diagram illustrating a group of subframes in which two virtual carriers change location within a host carrier band.

Thus far examples of virtual carrier implementations have primarily been described for the sake of example in terms of a host carrier in which a single virtual carrier has been inserted, as shown for example in FIG. 5. However, as discussed above with reference to FIG. 10, a wireless telecommunications system may allow for a plurality of locations for a virtual carrier. Furthermore, referring to the four potential example locations schematically represented in FIG. 10, in some cases only one of the locations may be used for supporting a virtual carrier, whereas in other cases more than one location may be used for simultaneously supporting more than one virtual carrier. That is to say, a first virtual carrier, VC1, might be supported in the frequency band label L1 in FIG. 10, a second virtual carrier, VC2, might be supported in the frequency band label L2, and respective third and fourth virtual carriers, VC3 and VC4, might be supported in the frequency bands labelled L3 and L4. Another example in which a host carrier may support more than one virtual carrier is shown for example in FIG. 12. FIG. 12 shows an example in which two virtual carriers VC1 (330) and VC2 (331) are simultaneously provided within a host carrier 320. In this example, the two virtual carriers may change location within the host carrier band, for example according to a pseudo-random algorithm. However, in other examples, one or both (or more where more virtual carriers are supported) of the two virtual carriers may always be found in the same frequency range within the host carrier frequency range (for example, in line with the locations represented in FIG. 10), or may change position according to a different mechanism. In LTE, the number of virtual carriers within a host carrier is in principle limited only by the size of the host carrier relative to the bandwidths of the virtual carriers. However, in some cases it may be considered that too many virtual carriers within the host carrier may unduly limit the bandwidth available for transmitting data to conventional LTE terminals and an operator may therefore decide on a number of virtual carrier within a host carrier according to, for example, a ratio of conventional LTE users/virtual carrier users.

In some examples the number of active virtual carriers can be dynamically adjusted such that it fits the current needs of conventional LTE terminals and virtual carrier terminals. For example, if no virtual carrier terminal is connected or if their access is to be intentionally limited, the network can arrange to begin scheduling the transmission of data to LTE terminals within the sub-carriers previously reserved for the virtual carrier. This process can be reversed if the number of active virtual carrier terminals begins to increase. In some examples the number of virtual carriers provided may be increased in response to an increase in the presence of virtual carrier terminals. For example if the number of virtual carrier terminals present in a network or area of a network exceeds a threshold value, an additional virtual carrier is inserted in the host carrier. The network elements and/or network operator can thus activate or deactivate the virtual carriers whenever appropriate.

The virtual carrier shown for example in FIG. 5 is 144 sub-carriers in bandwidth. However, in other examples a virtual carrier may be of any size between twelve sub-carriers to 1188 sub-carriers (for a carrier with a 1200 sub-carrier transmission bandwidth). Because in LTE the centre band has a bandwidth of 72 sub-carriers, a virtual carrier terminal in an LTE environment preferentially has a receiver bandwidth of at least 72 sub-carriers (1.08 MHz) such that it can decode the centre band 310, therefore a 72 sub-carrier virtual carrier may provide a convenient implementation option. With a virtual carrier comprising 72 sub-carriers, the virtual carrier terminal does not have to adjust the receiver's bandwidth for camping on the virtual carrier which may therefore reduce complexity of performing the camp-on process, but there is no requirement to have the same bandwidth for the virtual carrier as for the centre band and, as explained above, a virtual carrier based on LTE can be of any size between 12 to 1188 sub-carriers. For example, in some systems, a virtual carrier having a bandwidth of less than 72 sub-carriers may be considered as a waste of the virtual carrier terminal's receiver resources, but from another point of view, it may be considered as reducing the impact of the virtual carrier on the host carrier by increasing the bandwidth available to conventional LTE terminals. The bandwidth of a virtual carrier can therefore be adjusted to achieve the desired balance between complexity, resource utilization, host carrier performance and requirements for virtual carrier terminals.

Uplink Transmission Frame

So far, the virtual carrier has been discussed primarily with reference to the downlink, however in some examples a virtual carrier can also be inserted in the uplink.

In frequency division duplex (FDD) networks both the uplink and downlink are active in all subframes, whereas in time division duplex (TDD) networks subframes can either be assigned to the uplink, to the downlink, or further sub-divided into uplink and downlink portions.

In order to initiate a connection to a network, conventional LTE terminals make a random access request on the physical random access channel (PRACH). The PRACH is located in predetermined blocks of resource elements in the uplink frame, the positions of which are signaled to the LTE terminals in the system information signaled on the downlink.

Additionally, when there is pending uplink data to be transmitted from an LTE terminal and the terminal does not already have any uplink resources allocated to it, it can transmit a random access request PRACH to the base station. A decision is then made at the base station as to which if any uplink resource is to be allocated to the terminal device that has made the request. Uplink resource allocations are then signaled to the LIE terminal on the physical downlink control channel (PDCCH) transmitted in the control region of the downlink subframe.

In LTE, transmissions from each terminal device are constrained to occupy a set of contiguous resource blocks in a frame. For the physical uplink shared channel (PUSCH) the uplink resource allocation grant received from the base station will indicate which set of resource blocks to use for that transmission, where these resource blocks could be located anywhere within the channel bandwidth.

The first resources used by the LTE physical uplink control channel (PUCCH) are located at both the upper and lower edge of the channel, where each PUCCH transmission occupies one resource block. In the first half of a subframe this resource block is located at one channel edge, and in the second half of a subframe this resource block is located at the opposite channel edge. As more PUCCH resources are required, additional resource blocks are assigned in a sequential manner, moving inward from the channel edges. Since PUCCH signals are code division multiplexed, an LTE uplink can accommodate multiple PUCCH transmissions in the same resource block.

Virtual Uplink Carrier

In accordance with some implementations, the virtual carrier terminals described above can also be provided with a reduced capability transmitter for transmitting uplink data. The virtual carrier terminals are arranged to transmit data across a reduced bandwidth. The provision of a reduced capability transmitter unit provides corresponding advantages to those achieved by providing a reduced capability receiver unit with, for example, classes of devices that are manufactured with a reduced capability for use with, for example, MTC type applications.

Figure 13A:
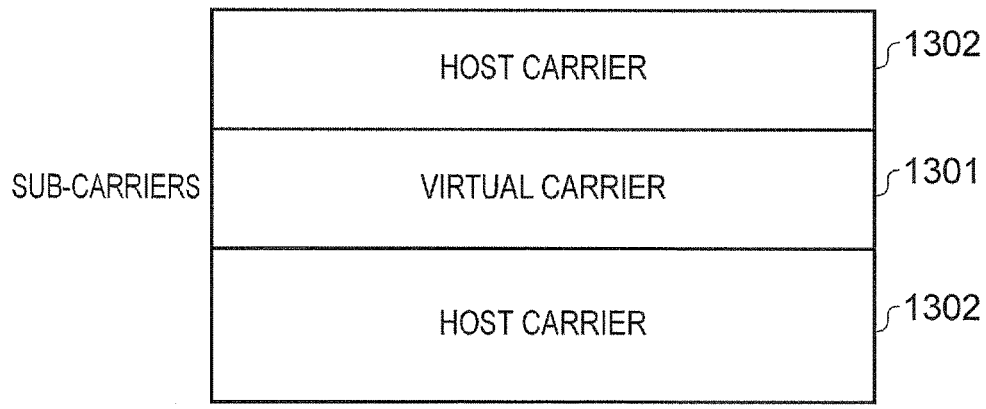
FIGS. 13A to 13C provide schematic diagrams illustrating LTE uplink subframes in which an uplink virtual carrier has been inserted.

In correspondence with the downlink virtual carrier, the virtual carrier terminals transmit uplink data across a reduced range of sub-carriers within a host carrier that has a greater bandwidth than that of the reduced bandwidth virtual carrier. This is shown in FIG. 13A. As can be seen from FIG. 13A, a group of sub-carriers in an uplink subframe form a virtual carrier 1301 within a host carrier 1302. Accordingly, the reduced bandwidth across which the virtual carrier terminals transmit uplink data can be considered a virtual uplink carrier.

In order to implement the virtual uplink carrier, the base station scheduler serving a virtual carrier ensures that all uplink resource elements granted to virtual carrier terminals are sub-carriers that fall within the reduced bandwidth range of the reduced capability transmitter units of the virtual carrier terminals. Correspondingly, the base station scheduler serving the host carrier typically ensures that all uplink resource elements granted to host carrier terminals are sub-carriers that fall outside the set of sub-carriers occupied by the virtual carrier terminals. However, if the schedulers for the virtual carrier and the host carrier are implemented jointly, or have means to share information, then the scheduler of the host carrier can assign resource elements from within the virtual carrier region to terminal devices on the host carrier during subframes when the virtual carrier scheduler indicates that some or all of the virtual carrier resources will not be used by terminal devices on the virtual carrier.

If a virtual carrier uplink incorporates a physical channel that follows a similar structure and method of operation to the LTE PUCCH, where resources for that physical channel are expected to be at the channel edges, for virtual carrier terminals these resources could be provided at the edges of the virtual carrier bandwidth and not at the edges of the host carrier. This is advantageous since it would ensure that virtual carrier uplink transmissions remain within the reduced virtual carrier bandwidth.

Virtual Uplink Carrier Random Access

In accordance with conventional LTE techniques, it cannot be guaranteed that the PRACH will be within the sub-carriers allocated to the virtual carrier. In some embodiments therefore, the base station provides a secondary PRACH within the virtual uplink carrier, the location of which can be signaled to the virtual carrier terminals via system information on the virtual carrier. This is shown for example in FIG. 13B in which a PRACH 1303 is located within the virtual carrier 1301. Thus, the virtual carrier terminals send PRACH requests on the virtual carrier PRACH within the virtual uplink carrier. The position of the PRACH can be signaled to the virtual carrier terminals in a virtual carrier downlink signaling channel, for example in system information on the virtual carrier.

Figure 13B:
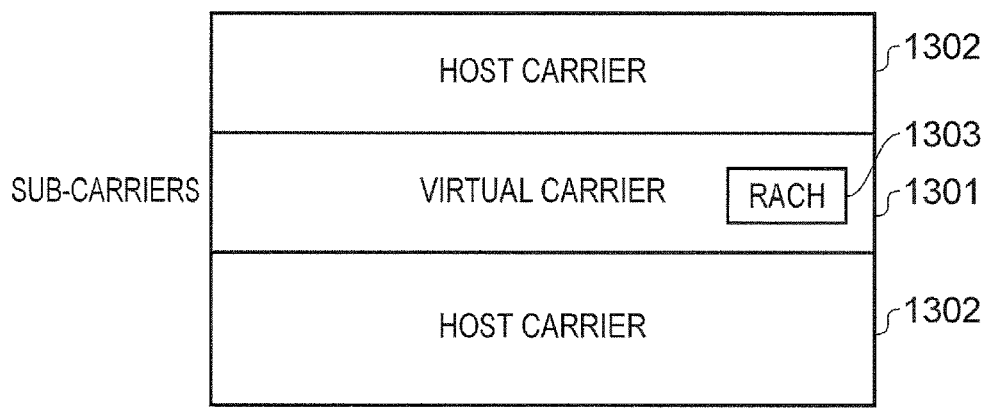
Figure 13C:
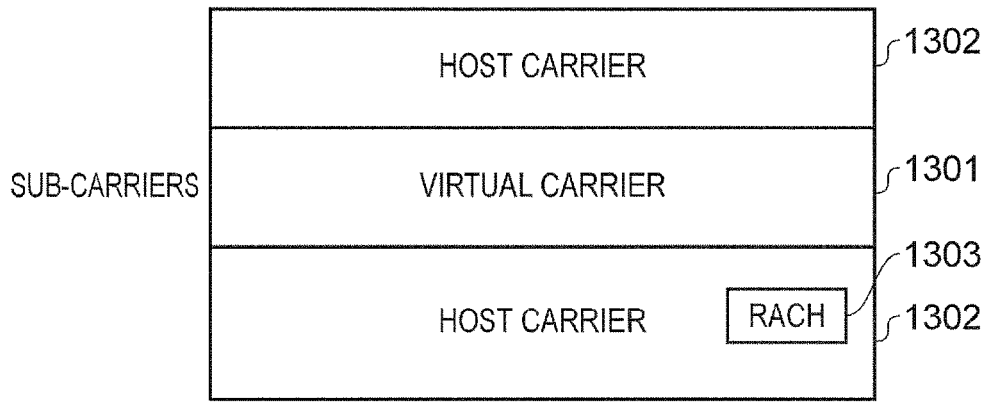

However, in other examples, the virtual carrier PRACH 1303 is situated outside of the virtual carrier as shown for example in FIG. 13C. This leaves more room within the virtual uplink carrier for the transmission of data by the virtual carrier terminals. The position of the virtual carrier PRACH is signaled to the virtual carrier terminals as before but in order to transmit a random access request, the virtual carrier terminals re-tune their transmitter units to the virtual carrier PRACH frequency because it is outside of the virtual carrier. The transmitter units are then re-tuned to the virtual carrier frequency when uplink resource elements have been allocated.

In some examples where the virtual carrier terminals are capable of transmitting on a PRACH outside of the virtual carrier, the position of the host carrier PRACH can be signaled to the virtual carrier terminals. The virtual carrier terminals can then simply use the conventional host carrier PRACH resource to send random access requests. This approach is advantageous as fewer PRACH resources have to be allocated.

However, if the base station is receiving random access requests from both conventional LTE terminals and virtual carrier terminals on the same PRACH resource, it is necessary that the base station is provided with a mechanism for distinguishing between random access requests from conventional LTE terminals and random access requests from virtual carrier terminals.

Therefore, in some examples a time division allocation is implemented at the base station whereby, for example, over a first set of subframes the PRACH allocation is available to the virtual carrier terminals and over a second set of subframes the PRACH allocation is available to conventional LTE terminals. Accordingly, the base station can determine that random access requests received during the first set of subframes originate from virtual carrier terminals and random access requests received during the second set of subframes originate from conventional LTE terminals.

In other examples, no mechanism is provided to prevent both virtual carrier terminals and conventional LTE terminals transmitting random access requests at the same time. However, the random access preambles that are conventionally used to transmit a random access request are divided into two groups. The first group is used exclusively by virtual carrier terminals and the second group is used exclusively by conventional LTE terminals. Accordingly, the base station can determine whether a random request originated from a conventional LTE terminal or a virtual carrier terminal simply by ascertaining to what group the random access preamble belongs.

Example Architecture

Figure 14:
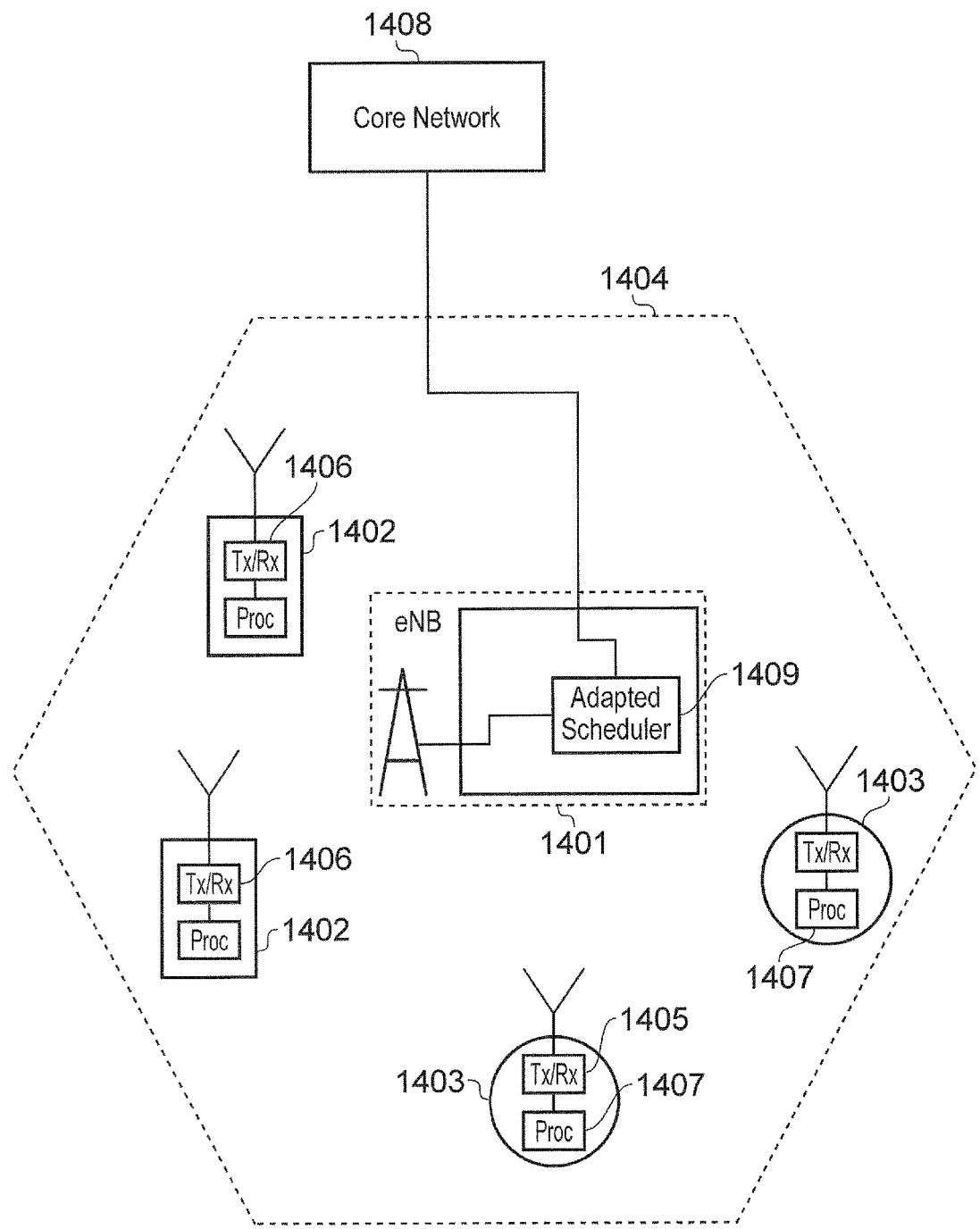
FIG. 14 provides a schematic diagram showing part of an adapted LTE mobile telecommunication network arranged in accordance with an example of the present invention.

FIG. 14 provides a schematic diagram showing part of an adapted LTE mobile telecommunication system arranged in accordance with an example of the present invention. The system includes an adapted enhanced Node B (eNB/base station) 1401 connected to a core network 1408 which communicates data to a plurality of conventional LTE terminals 1402 and reduced capability terminals 1403 within a coverage area (cell) 1404. Each of the reduced capability terminals 1403 has a tuneable transceiver unit 1405 which includes a receiver unit capable of receiving data across a reduced bandwidth and a transmitter unit capable of transmitting data across a reduced bandwidth when compared with the capabilities of the transceiver units 1406 included in the conventional LTE terminals 1402.

The adapted eNB 1401 is arranged to transmit downlink data using a subframe structure that includes a virtual carrier as described above, for example with reference to FIG. 5, and to receive uplink data using a subframe structure as described with reference to FIG. 13B or 13C. The reduced capability terminals 1403 are thus able to receive and transmit data using the uplink and downlink virtual carriers as described above.

As has been explained above, because the reduced complexity terminals 1403 receive and transmit data across a reduced bandwidth on the uplink and downlink virtual carriers, the complexity, power consumption and cost of the transceiver unit 1405 needed to receive and decode downlink data and to encode and transmit uplink data is reduced compared to the transceiver unit 1406 provided in the conventional LTE terminals.

When receiving downlink data from the core network 1408 to be transmitted to one of the terminals within the cell 1404, the adapted eNB 1401 is arranged to determine if the data is bound for a conventional LTE terminal 1402 or a reduced capability terminal 1403. This can be achieved using any suitable technique. For example, data bound for a reduced capability terminal 1403 may include a virtual carrier flag indicating that the data must be transmitted on the downlink virtual carrier. If the adapted eNB 1401 detects that downlink data is to be transmitted to a reduced capability terminal 1403, an adapted scheduling unit 1409 included in the adapted eNB 1401 ensures that the downlink data is transmitted to the reduced capability terminal in question on the downlink virtual. In another example the network is arranged so that the virtual carrier is logically independent of the eNB. More particularly the virtual carrier may be arranged to appear to the core network as a distinct cell so that it is not known to the core network that the virtual carrier has any relationship with the host carrier. Packets are simply routed to/from the virtual carrier just as they would be for a conventional cell.

In another example, packet inspection is performed at a suitable point within the network to route traffic to or from the appropriate carrier (i.e. the host carrier or the virtual carrier).

In yet another example, data from the core network to the eNB is communicated on a specific logical connection for a specific terminal device. The eNB is provided with information indicating which logical connection is associated with which terminal device. Information is also provided at the eNB indicating which terminal devices are virtual carrier terminals and which are conventional LTE terminals. This information could be derived from the fact that a virtual carrier terminal would initially have connected using virtual carrier resources. In other examples virtual carrier terminals are arranged to indicate their capability to the eNB during the connection procedure. Accordingly the eNB can map data from the core network to a specific terminal device based on whether the terminal device is a virtual carrier terminal or an LTE terminal.

When scheduling resources for the transmission of uplink data, the adapted eNB 1401 is arranged to determine if the terminal to be scheduled resources is a reduced capability terminal 1403 or a conventional LTE terminal 1402. In some examples this is achieved by analysing the random access request transmitted on the PRACH using the techniques to distinguish between a virtual carrier random access request and a conventional random access request as described above. In any case, when it has been determined at the adapted eNB 1401 that a random access request has been made by a reduced capability terminal 1402, the adapted scheduler 1409 is arranged to ensure that any grants of uplink resource elements are within the virtual uplink carrier.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement what might be called a dedicated messaging network (DMN) which is "laid over" a conventional network and used to communicate messaging data to DMN devices (i.e. virtual carrier terminals), for example classes of MTC devices.

Further Example Applications of Virtual Carriers

Having set out the concepts of virtual carriers of the kind described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9], GB 1121767.6 [10] and GB 1121766.8 [11], some other extensions of the virtual carrier concept in accordance with some embodiments of the invention are described.

Figure 15:
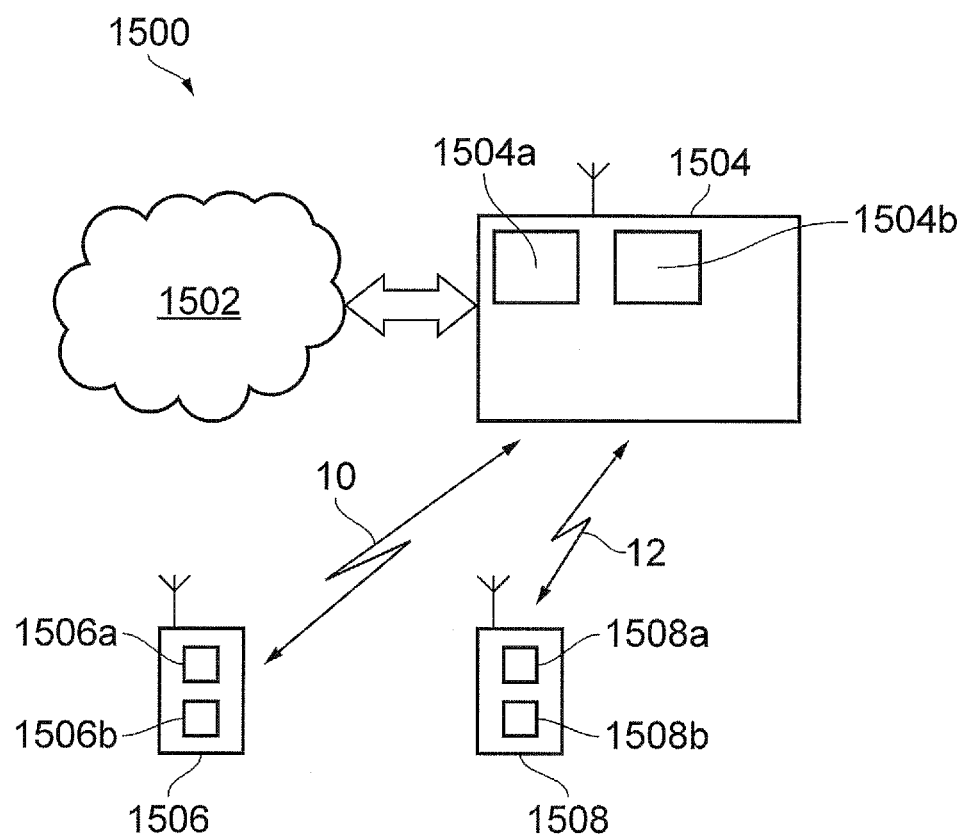
FIG. 15 schematically shows a mobile telecommunication network architecture according to an embodiment of the invention.

FIG. 15 schematically shows a telecommunications system 1500 according to an embodiment of the invention. The telecommunications system 1500 in this example is based broadly on an LTE-type architecture in which virtual carriers, such as described above, are implemented. As such many aspects of the operation of the telecommunications system 1500 are known and understood and are not described here in detail in the interest of brevity. Operational aspects of the telecommunications system 1500 which are not specifically described herein may be implemented in accordance with any known techniques, for example according to the current LTE-standards with appropriate modifications to support virtual carriers as has been previously proposed.

The telecommunications system 1500 comprises a core network part (evolved packet core) 1502 coupled to a radio network part. The radio network part comprises a base station (evolved-nodeB) 1504 coupled to a plurality of terminal devices. In this example, two terminal devices are shown, namely a first terminal device 1506 and a second terminal device 1508. It will of course be appreciated that in practice the radio network part may comprise a plurality of base stations serving a larger number of terminal devices across various communication cells. However, only a single base station and two terminal devices are shown in FIG. 15 in the interests of simplicity.

As with a conventional mobile radio network, the terminal devices 1506, 1508 are arranged to communicate data to and from the base station (transceiver station) 1504. The base station is in turn communicatively connected to a serving gateway, S-GW, (not shown) in the core network part which is arranged to perform routing and management of mobile communications services to the terminal devices in the telecommunications system 1500 via the base station 1504. In order to maintain mobility management and connectivity, the core network part 1502 also includes a mobility management entity (not shown) which manages the enhanced packet service, EPS, connections with the terminal devices 1506, 1508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 1502 to an external packet data network, for example the Internet. As noted above, the operation of the various elements of the communications system 1500 shown in FIG. 15 may be broadly conventional apart from where modified to provide functionality in accordance with embodiments of the invention as discussed herein.

In this example, it is assumed the first terminal device 1506 is a conventional smart-phone type terminal device communicating with the base station 1504 primarily using resources associated with the host carrier component of the radio interface. This first terminal device 1504 comprises a transceiver unit 1506a for transmission and reception of wireless signals and a controller unit 1506b configured to control the smart phone 1506. The controller unit 1506b may comprise a processor unit which is suitably configured/programmed to provide the desired functionality using conventional programming/configuration techniques for equipment in wireless telecommunications systems. The transceiver unit 1506a and the controller unit 1506b are schematically shown in FIG. 15 as separate elements. However, it will be appreciated that the functionality of these units can be provided in various different ways, for example using a single suitably programmed integrated circuit. As will be appreciated the smart phone 1506 will in general comprise various other elements associated with its operating functionality.

In this example, it is assumed the second terminal device 1508 is a machine-type communication (MTC) terminal device communicating with the base station 1504 using resources associated with a virtual carrier component of the radio interface. Furthermore, it is assumed for this example the base station 1504 is able to support multiple virtual carriers at different frequency locations within the host carrier, for example as schematically represented in FIGS. 10 and 12, and that the second terminal device 1508 is frequency tunable such that it is able to selectively operate on different ones of the virtual carrier frequencies. As discussed above, machine-type communication terminal devices can in some cases be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 1508 in FIG. 15 is such a device.

As with the smart phone 1506, the MTC device 1508 comprises a transceiver unit 1508a for transmission and reception of wireless signals and a controller unit 1508b configured to control the MTC device 1508. The transceiver unit 1508a is tunable such that it may be tuned to receive communications from the base stations within its operating bandwidth at different frequency locations within the overall operating bandwidth of the base station (corresponding here to the bandwidth of the host carrier). The controller unit 1508b may comprise various sub-units for providing functionality in accordance with embodiments of the invention as explained further below. These sub-units may be implemented as discrete hardware elements or as appropriately configured functions of the controller unit. Thus the controller unit 1508b may comprise a processor unit which is suitably configured/programmed to provide the desired functionality described herein using conventional programming/configuration techniques for equipment in wireless telecommunications systems. The transceiver unit 1508a and the controller unit 1508b are schematically shown in FIG. 15 as separate elements for ease of representation. However, it will be appreciated that the functionality of these units can be provided in various different ways following established practices in the art, for example using a single suitably programmed integrated circuit. It will be appreciated the MTC device 1508 will in general comprise various other elements associated with its operating functionality.

The base station 1504 comprises a transceiver unit 1504a for transmission and reception of wireless signals and a controller unit 1504b configured to control the base station 1504. As noted above, the transceiver unit 1504a of the base station 1504 is configured to support multiple virtual carriers within a host carrier. The controller unit 1506b may again comprise various sub-units, such as a scheduling unit, for providing functionality in accordance with embodiments of the invention as explained further below. These sub-units may be implemented as discrete hardware elements or as appropriately configured functions of the controller unit. Thus, the controller unit 1504b may comprise a processor unit which is suitably configured/programmed to provide the desired functionality described herein using conventional programming/configuration techniques for equipment in wireless telecommunications systems. The transceiver unit 1504a and the controller unit 1504b are schematically shown in FIG. 15 as separate elements for ease of representation. However, it will be appreciated that the functionality of these units can be provided in various different ways following established practices in the art, for example using a single suitably programmed integrated circuit. It will be appreciated the base station 1504 will in general comprise various other elements associated with its operating functionality.

Thus, the base station 1504 is configured to communicate data with the smart phone 1506 over a first radio communication link 1510 associated with a host carrier of the wireless telecommunications system and to communicate data with the MTC device 1508 over a second radio communication link 1512 associated with a virtual carrier of the wireless application system, and wherein the virtual carrier supporting the second radio communication link is one of a plurality of virtual carriers supported by the base station 1504. It is assumed here the base station 1504 is configured to communicate with the smart phone 1506 over the first radio communication link 1510 in accordance with the established principles of LTE-based communications supporting a host and virtual carrier, such as described above.

A significant aspect of the wireless telecommunications system 1500 schematically represented in FIG. 15 is that the base station is configured to communicate data on virtual carriers at different locations within the base station's overall operating bandwidth (i.e. the base station supports multiple virtual carriers at different frequency locations). For the sake of a concrete example, it is assumed here the base station is associated with an overall operating bandwidth of the 20 MHz, and supports virtual carrier communications with reduced capability devices, such as MTC-type terminal device 1508, using four virtual carriers with each one having a restricted frequency bandwidth of 1.4 MHz. Furthermore, it is assumed in this example the four virtual carriers are at fixed frequency locations evenly distributed across the overall operating bandwidth of 20 MHz. Thus in this example the base station supports a first virtual carrier, VC 1, centred around a frequency location of 2.5 MHz relative to lower edge of its overall 20 MHz bandwidth, a second virtual carrier, VC 2, centred around a frequency location of 7.5 MHz from the lower edge of the host bandwidth, a third virtual carrier, VC 3, centred around a frequency location of 12.5 MHz from the lower edge of the host bandwidth, and a fourth virtual carrier, VC 4, centred around a frequency location of 17.5 MHz from the lower edge of the host bandwidth. It will be appreciated these values simply represent one example implementation, and in other examples there may be different numbers of virtual carriers and/or the virtual carriers may be distributed differently throughout the host carrier bandwidth. In the example represented in FIG. 15 it is assumed the base station 1504 is initially communicating with the MTC device 1508 using frequency resources associated with the first virtual carrier VC 1. Thus, the tunable transceiver 1508a of the MTC terminal device 1508 is appropriately tuned to the frequency location associated with virtual carrier VC 1. The MTC terminal device 1508 may currently be operating on the virtual carrier VC 1 simply because this was the first virtual carrier the MTC device found during a camp-on procedure or because the MTC device is configured to always initially camp-on to a virtual carrier VC 1, or because the base station has previously instructed the MTC device to operate on this particular virtual carrier. For example, the base station may be configured to initially allocate different MTC terminal devices to different virtual carriers to manage/balance loading on the different virtual carriers and to provide appropriate instruction signalling to the respective MTC devices as regards which virtual carrier they should be using, for example with signalling exchanged during an initial attach procedure.

Thus, FIG. 15 represents a situation in which the MTC device 1508 is operating within the wireless telecommunications system 1500 by communicating with the base station on a restricted bandwidth frequency carrier at the frequency location associated with the first virtual carrier VC1 supported by the base station. The operation of the MTC device on this virtual carrier may largely follow the previously-proposed ideas for operating reduced capability terminal devices on virtual carriers, but with modifications in accordance with embodiments of the invention as discussed further below.

As has been previously proposed for virtual carrier implementations, communications between the base station 1504 and the MTC device 1508 may in many respects follow broadly conventional LTE-type techniques (or corresponding techniques in the context of wireless telecommunications systems operating according to other standards). For example, reference signalling within the bandwidth of the virtual carrier may be used by the MTC device to measure channel conditions existing between the base station and the MTC device, and the MTC device may report an indication of the measurements to the base station (e.g. a CQI type report for the virtual carrier). Thus the base station may be provided with information on channel conditions for the virtual carrier to allow the base station to perform link adaptation in respect of communications with the MTC device on the virtual carrier in broadly the same manner as for conventional LTE-type communications, albeit within a restricted bandwidth.

The inventors have recognised an aspect of virtual carrier operation which does not apply for conventional LTE modes of operation is the potential for in effect switching an MTC device from being served on one virtual carrier to being served on another virtual carrier. For example, with reference to the specific example described above in which MTC device 1508 is being served on virtual carrier VC 1, there is in principle the potential for communications with the MTC device 1508 to switch to another one of the four virtual carriers supported in this particular example. The inventors have recognised that this allows for what is in effect another level of potential link adaptation that may be applied to optimise communications between the base station and the MTC device. In order to take advantage of this possibility, the inventors have developed approaches which allow an MTC device operating on a restricted frequency bandwidth within a wider system bandwidth to measure channel conditions at different locations within the system bandwidth and to provide information derived from such measurements to a supporting base station. This can therefore allow the base station to take account of the measured channel conditions at different frequency locations within the system bandwidth when scheduling frequency locations for supporting the MTC device. For example, the base station may select a particular virtual carrier frequency to use for communications with the MTC device based on the measured channel conditions.

Figure 16:
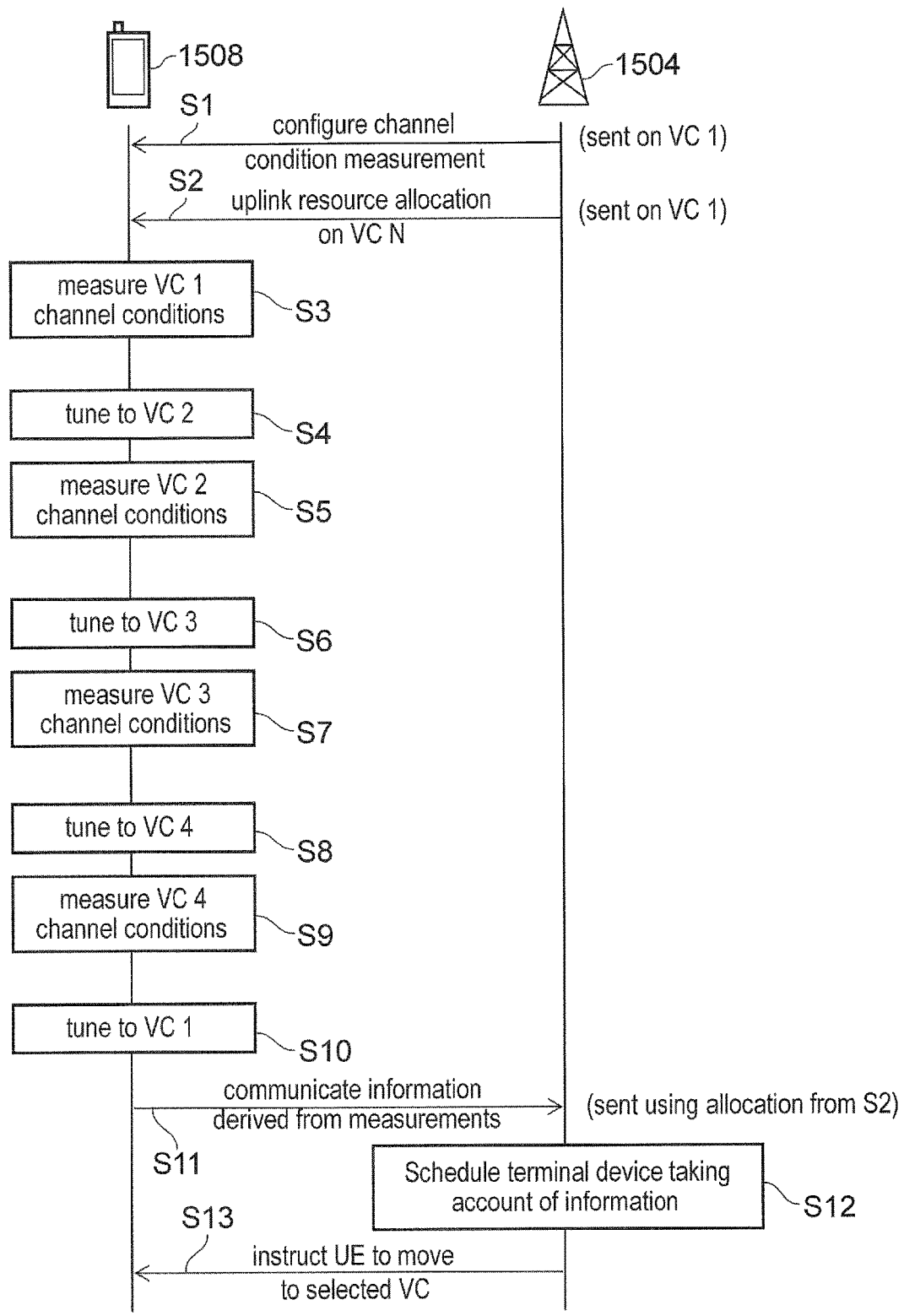
FIGS. 16 and 17 are signalling ladder diagrams schematically representing methods of operation in accordance with embodiments of the invention.

FIG. 16 is a signalling ladder diagram schematically representing communications between a base station and a terminal device and steps performed by the base station and terminal device in accordance with certain embodiments of the invention. In this example it is assumed the base station and the terminal device correspond with the base station 1504 and the terminal device 1508 schematically represented in FIG. 15 with the terminal device 1508 initially attached to the base station using virtual carrier VC 1.

The signalling represented in FIG. 16 starts from a point at which the base station 1504 has determined that the terminal device should measure channel conditions in accordance with an embodiment of the invention. This might be, for example, because the base station is configured to request such measurements according to a predefined schedule, or perhaps because the base station has recognised that communications with the terminal device are being impacted by poor channel conditions on the currently used virtual carrier (for example based on conventional LTE-type channel condition reporting within the bandwidth of the virtual carrier).

Thus in a first step S1 represented in FIG. 16 the base station 1504 transmits signalling to the MTC device 1508 to instruct the terminal device to perform channel condition measurements in accordance with an embodiment of the invention. As noted above, it is assumed the terminal device is initially operating on a virtual carrier VC 1 and so this signalling is correspondingly sent by the base station to the MTC device on VC1. The instruction signalling S1 may comprise configuration information to assist the terminal device. For example, the instruction signalling sent in step S1 may comprise an indication of the frequency locations for which the base station would like the terminal device to measure channel conditions. These may be provided, for example, as an indication of specific subcarrier frequencies for which measurements are desired, or by reference to one or more predefined frequency locations, for example by way of an index referring to certain pre-defined virtual carrier frequencies supported by the base station. For example, in the above-described case where the base station supports four virtual carriers which might be referred to as VC 1, VC 2, VC 3 and VC 4, the configuration messaging may comprise an indication of one or more of the respective indices 1 to 4 for which the base station would like the terminal device to perform channel condition measurements. Other information that may be conveyed by the base station regarding the measures to be made might include, for example, an indication of the bandwidth over which the measurements are to be made (e.g. where this is not fixed). In other examples there may be no additional configuration information beyond an indication that the base station should initiate channel condition measurement and reporting in accordance with an embodiment of the invention. In such cases the terminal device might, for example, be configured to perform the measurements in a predefined manner (for example, by taking measurements for all virtual carrier frequencies supported by the base station in the implementation at hand). For the example schematically represented in FIG. 16 it will be assumed the base station instructs the terminal device to make channel condition measurements for all four virtual carriers which the base station supports in this example implementation. The signalling sent in step S1 of FIG. 16 may be transmitted in accordance with any conventional technique for conveying control information from a base station to a terminal device in a wireless telecommunications system.

In step S2 represented in FIG. 16, the base station conveys an uplink resource allocation to the terminal device which the terminal device should later use to report information derived from the measurements it has been instructed to make. It will be appreciated the timing for the allocated uplink resources will be delayed to allow the terminal device time to perform the instructed measurements. Because of this it may be appropriate for the uplink resource allocation to be made in a different way from conventional uplink resource allocations, for example any of the established techniques for higher layer control signalling may be used to convey an indication of the resources on which the terminal device is to report on the measurements. As with the signalling represented in step S1, this signalling represented in step S2 may be sent on virtual carrier VC 1 using established techniques for conveying control information in a wireless telecommunications network implementing a virtual carrier.

Having received the instruction to perform channel condition measurements and having determined the frequency locations for which channel condition measurements are to be made (either based on configuration information received from the base station, or in accordance with a pre-defined fixed scheme) the terminal device proceeds to make these measurements as schematically represented in steps S3 to S9 of FIG. 16. Thus in step S3 the terminal device measures the channel conditions for VC 1. This is the virtual carrier to which the terminal device is initially tuned. The channel conditions for VC 1 may be measured in accordance with any conventional techniques. For example, relying on reference signalling measurements to established a CQI parameter for VC 1. In this example it is assumed only a single CQI (i.e. corresponding to a wideband CQI) is established for the virtual carrier bandwidth VC 1. Having made the measurement, the terminal device stores an indication of the results in a memory and proceeds to step S4 represented in FIG. 16.

In step S4 the terminal device tunes its transceiver to correspond with a frequency location for the second virtual carrier VC 2. When the terminal device transceiver has been retuned to a frequency location corresponding to VC 2 the terminal device proceeds to measure channel conditions for VC 2 in step S5 and record the results in memory. This measurement may again be made in accordance with generally conventional techniques for measuring channel conditions in wireless telecommunications systems. For example, the measurement might comprise a measurement of a received reference signal and a measurement of noise (measurement of noise plus interference) in the usual way. In the same way the terminal device proceeds to retune itself to a frequency location corresponding to virtual carrier VC 3 in step S6, and measure channel conditions for VC 3 in step S7 and to retune itself to a frequency location corresponding to virtual carrier VC 4 in step S8, and measure channel conditions for VC 4 in step S9.

Having completed the channel condition measurements for the frequency locations of interest, the terminal device retunes its transceiver back to a frequency location corresponding to virtual carrier VC 1, as schematically represented in step S10 of FIG. 16.

Thus, after step S10 represented in FIG. 16 the terminal device has sequentially measured channel conditions for each virtual carrier VC 1, VC 2, VC 3 and VC 4, stored a corresponding indication of the results of the measurements in a memory, and retuned its transceiver back to virtual carrier VC 1. The terminal device in accordance with embodiments of the invention is configured to derive information from the measurements and communicate this information to the base station in a channel condition measurement report, as schematically represented in step S11 of FIG. 16. This communication is sent on the resources allocated to the terminal device for uplink communication in step S2.

The information communicated from the terminal device to the base station may be different in accordance with different example implementations. For the specific example represented in FIG. 16 the terminal device is configured to determine from the respective channel condition measurements which virtual carrier frequency location is associated with the best channel conditions and to communicate this to the base station along with an indication of the corresponding measurement of channel conditions. That is to say, the information conveyed in the signalling represented in step S11 corresponds with an indication of a frequency location for a virtual carrier which the terminal device has selected as being associated with the best channel conditions from those which have been measured and an indication of what those best channel conditions are. Additional information, such as an indication of the time at which the relevant measurements were made, may also be communicated to the base station. The indication of the frequency location determined by the terminal device as being associated with the best channel conditions may thus be considered as being an indication of a terminal device selected frequency suggestion to use for subsequent virtual carrier operation.

On receiving the information from the terminal device, the base station makes scheduling decisions for the terminal device in a manner which takes account of the information, as schematically represented in step S12. For example, if the terminal device is initially operating on VC 1, but the information communicated in step S11 of FIG. 16 indicates the terminal device has determined from its measurements that virtual carrier VC 3 provides better channel conditions, the base station may determine that future scheduling for the terminal device should be moved to virtual carrier VC 3. If the base station determines from the information received from the terminal device that the terminal device would be better served on a different virtual carrier, and furthermore the base station is able to support the terminal device on that virtual carrier (i.e. there is capacity for the mobile terminal on the suggested virtual carrier), the base station may provide instruction signalling to the terminal device to instruct the terminal device to move to the selected virtual carrier. This is schematically represented in FIG. 16 by signalling step S13. This signalling may be made in accordance with any established techniques for conveying control signalling in wireless telecommunications systems.

On receiving such an instruction the terminal device may retune its transceiver and attach to the selected virtual carrier in accordance with conventional techniques, and thereby begin operating on the newly-selected virtual carrier (not shown in FIG. 16).

Thus, the approach of FIG. 16 represents a technique whereby a terminal device with a reduced bandwidth capability can provide feedback to a base station regarding channel conditions across a wider range of frequencies than the terminal device's operating bandwidth, thereby allowing the base station to determine whether the terminal device may be better served (for example in terms of achieving higher data rates) if it were to be moved to operate on a different virtual carrier frequency.

It will of course be appreciated the operation represented in FIG. 16 might be modified in various ways in accordance with other implementations.

For example, instead of the terminal device communicating to the base station an indication of which virtual carrier frequency location is measured as being associated with the best channel conditions, the terminal device might communicate different and/or additional information derived from the measurements to the base station in a step corresponding to step S11 in FIG. 16.

In some embodiments the terminal device having made the measurements of channel conditions associated with a plurality of different potential virtual carrier locations might communicate an indication of the respective channel condition measurements to the base station. That is to say, the information derived from the channel condition measurements and communicated to the base station may comprise an indication of the respective measurements (or a subset of the respective measurements), for example parameterised in terms of a CQI-type parameter for each measurement. This provides the base station with information that would allow the base station to itself select the most appropriate virtual carrier for the terminal device. This approach provides the base station responsible for overall scheduling in the cell with more information which can help optimise the overall performance within the cell supported by the base station. For example, if the base station cannot accommodate the terminal device on the virtual carrier associated with the best channel conditions, for example because of overcapacity, the base station can instead consider moving the terminal device to the virtual carrier having the second best channel conditions. This approach would not be readily available if the terminal device were to report only the single virtual carrier with the best channel conditions. However, an advantage of the terminal device reporting only on the single virtual carrier with the best channel conditions is a reduction in the amount of data to be exchanged and a reduction in the processing requirements of the base station (because the terminal device processes the channel condition measurements to determine the best virtual carrier to use). An intermediate approach would be for the terminal device to report information regarding a subset of the virtual carriers' respective channel condition measurements. For example, instead of communicating information relating to the virtual carrier frequency location determined to have the best channel conditions, the terminal device might communicate an indication of which virtual carrier frequency locations are determined to have the best and second best channel conditions (and perhaps third best, and fourth best, and so on). In another example, the terminal device might communicate an indication of which virtual carrier frequency locations are associated with measured channel conditions meeting some predefined criterion, for example for which frequency locations a parameter derived from the channel condition measurements exceeds a pre-defined performance threshold value.

Furthermore, it will be appreciated other example implementations might not comprise all of the steps represented in FIG. 16 and/or might include corresponding steps performed in a different way. For example, in some embodiments the information conveyed in steps S1 and S2 might be conveyed from the base station to the terminal device in a single messaging step. In other examples an uplink resource allocation such as represented in step S2 might not be provided. Instead, the terminal device 1508 might simply perform the measurement under instruction received in step S1, and once the measurement is completed (i.e. after step S10 in FIG. 16) the terminal device might at that stage request uplink resources to allow it to send the information derived from the measurements to the base station in step S11. For example, having made the channel condition measurements and derived the information to be communicated to the base station, the terminal device might at that stage request resources through a conventional scheduling request procedure, for example using a RACH procedure. Alternatively, the signalling represented in step S2 might be provided at a later stage. For example, the base station may be configured to send an uplink resource allocation for the terminal device to use to report information derived from the measurements after the measurements have been made. For example, the base station might send signalling corresponding to that represented in step S1 of FIG. 16 to initiate the channel condition measurements, and then, after a given period of time has passed to allow the terminal device to make the measurements, the base station might send signalling corresponding to that represented in step S2.

In yet other examples, there may be no signalling corresponding to steps S1 and S2. Rather, the terminal device 1508 might, for example, be configured to initiate the measurement steps corresponding to those starting from step S3 of the operation represented in FIG. 16 without instruction from the base station. For example, the terminal device might be configured to do this according to a pre-defined schedule, or because the terminal device itself identifies that channel conditions have deteriorated on a currently used virtual carrier. When the terminal device has completed its measurements, it may request uplink resources in the usual way to allow it to convey the fact it has taken the measurements and the information derived from the measurements, to the base station. In other examples signalling such as represented in step S1 and/or step S2 FIG. 16 may be conveyed implicitly, rather than explicitly. For example, rather than send signalling corresponding to step S2 in FIG. 16, a wireless telecommunications system might be configured such that on receipt of signalling corresponding to step S1, the terminal device 1508 derives an uplink resource to be used for reporting the information derived from the measurements based on the resources used by the base station for signalling the instruction to initiate the measurement and reporting process.

In accordance with the approach of FIG. 16 there is a delay between making channel condition measurements and reporting the information derived from the channel condition measurements to the base station. For example, a terminal device will typically need some time to retune its transceiver between making measurements. Thus, while step S3 in FIG. 16 might be made in association with reference symbols transmitted in a given subframe, there may then be a delay of one or two subframes while the terminal device retunes its transceiver to VC 2 (step S4 in FIG. 16) before the measurements of VC 2 channel conditions (step S5 FIG. 16) can be made in a subsequent subframe. Because of this the measurements for all four virtual carriers in the example of FIG. 16 might in some embodiments take on the order of 10 subframes to perform. Where channel conditions are rapidly changing this delay might mean the channel condition information is reported too slowly for effective link adaptation. However, the inventors have recognised that categories of terminal device which are likely to be associated with virtual carrier operation will often be low mobility devices in semi-fixed installations for which fast changing channel conditions are less likely to be a concern.

Because in many virtual carrier implementations it is expected that fast channel condition reporting is not required (because the channel conditions will be more stable than for conventional devices which will typically have higher mobility), the inventors have also recognised that higher layer reporting of channel condition information might be adopted in accordance with embodiments of the invention. Conventional CQI-type reporting is based on layer one (physical layer) signalling exchange. However, in accordance with embodiments of the invention, the information communicated in step S11 FIG. 16 might be communicated with higher layer signalling, for example in RRC or MAC signalling. For example, the communication of information derived from the measurements of channel conditions may be achieved in an RRC message comprising a newly-defined information element comprising various fields for conveying the information according to the implementation at hand. For example, the information element may comprise fields for indicating a terminal-device selected preferred VC frequency location (index) and associated channel condition measurement and/or fields for indicating at least a subset of indications of the channel condition measurements for corresponding virtual carrier locations. As noted above, the virtual carrier locations may be defined in terms of specific frequencies, or in terms of indexing associated with a number of predefined frequency locations. In another example, corresponding information might be introduced in a MAC header.

One advantage of using higher-layer (i.e. higher than the physical layer) signalling for indicating the information derived from the channel condition measurements in accordance with some embodiments is the potential for higher transmission reliability because conventional retransmission protocols, for example based on acknowledgement signalling, can be adopted. Another advantage in accordance with some embodiments is a reduction in physical layer signalling, with a corresponding reduction in interference, as compared to what might otherwise be the case if a potentially large number of terminal devices were all reporting channel conditions using layer 1 (L1) reporting.

As noted above, it is expected that fast changing channel conditions will often be less of a concern for the types of terminal devices typically expected to be operating on a virtual carrier such that the delays associated with reporting using higher layer signalling as described above are not problematic.

Nonetheless, it is recognised that in some circumstances it may be preferable for faster reporting of channel conditions for different potential virtual carrier frequency locations than might be achieved with the approach represented in FIG. 16. With this in mind, FIG. 17 schematically represents an alternative approach for channel condition reporting in accordance with another embodiment of the invention.

Figure 17:
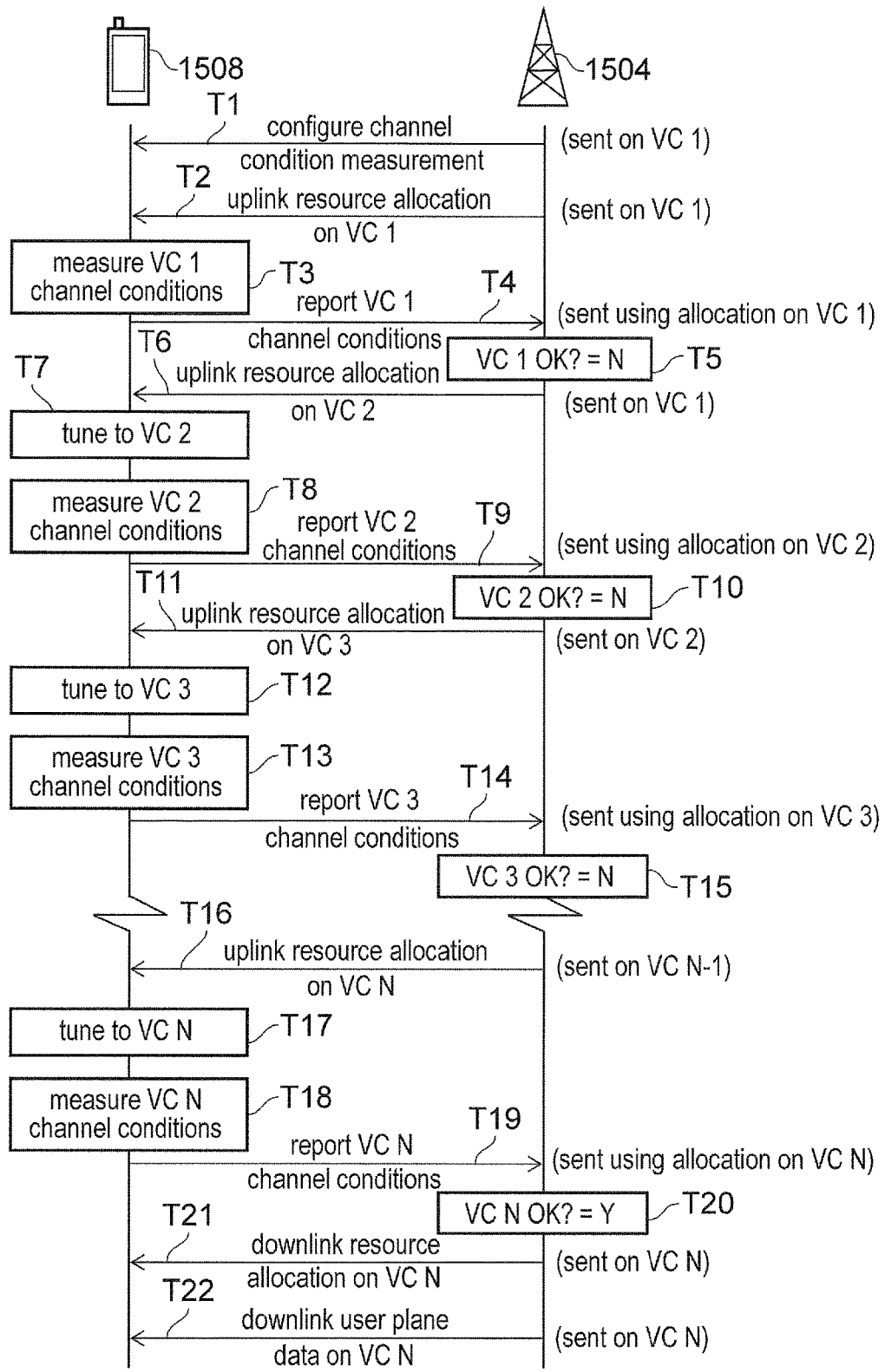

FIG. 17 is a signalling ladder diagram representing communications between a base station and a terminal device and steps performed by the base station and terminal device in accordance with certain embodiments of the invention. In this example it is assumed the base station and the terminal device again correspond with a base station 1504 and a terminal device 1508 such as schematically represented in FIG. 15 with the terminal device 1508 initially attached to the base station using virtual carrier VC 1.

As with the example represented in FIG. 16, the signalling represented in FIG. 17 starts from a point at which the base station 1504 has determined that the terminal device should measure channel conditions in accordance with an embodiment of the invention.

In a first step T1 represented in FIG. 17 the base station 1504 provides the terminal device 1508 with instructions to undertake the desired channel condition measurements. This step is similar to, and will be understood from, the corresponding step S1 in FIG. 16. The configuration information in this example may include an indication of an order in which the base station would like the terminal device to measure channel conditions for an indicated number of different potential virtual carrier frequency locations.

In a second step T2, the base station provides the terminal device 1508 with an indication of an uplink resource allocation on virtual carrier VC 1. This may be provided in accordance with broadly conventional techniques, for example for allocating resources for channel condition reporting on a physical uplink shared channel (PUSCH).

In a third step T3, the terminal device measures channel conditions on VC 1. This step is similar to and will be understood from the corresponding step S3 in FIG. 16.

In a fourth step T4, the terminal device sends a channel condition report to the base station using the uplink resources allocated in step T2. This reporting may be made in a manner which corresponds closely with conventional aperiodic CQI reporting in LIE-type telecommunications networks, for example.

In step T5 the base station determines whether the channel conditions on VC 1 are acceptable. If in step T5 the base station determines from the reported channel conditions for VC 1 that the channel performance is adequate for current scheduling needs, the processing represented in FIG. 17 may stop and the terminal device might simply continue to be served on virtual carrier VC 1 in the usual manner. However, in this example it is assumed the base station determines that the reported channel conditions for VC 1 are not sufficiently good and the terminal device should continue with measuring channel conditions for other virtual carriers to see if they are better. The decision as to what is considered to be sufficiently good will depend on the implementation at hand, for example taking account of upcoming scheduling requirements for the terminal device, and in particular how well these upcoming scheduling requirements would be served on a channel having the measured channel conditions. Having decided that the channel conditions on the virtual carrier VC 1 are not sufficiently good enough to provide a desired level of performance, or are only marginally good enough such that significantly better performance might be obtained on a different virtual carrier operating at a different frequency location, the base station communicates in step T6 an indication of an uplink resource allocation on the next virtual carrier to be measured, in this example virtual carrier VC 2. This allocation is sent on the virtual carrier VC 1 to which the terminal device is currently tuned.

On receiving the allocation of uplink resources on virtual carrier VC 2, the terminal device interprets this as an indication that it should proceed to measure channel conditions on VC 2, and, as schematically represented in steps T7 and T8, the terminal device tunes is transceiver to the frequency location of virtual carrier VC 2 and measures channel conditions on this channel. These steps T7 and T8 may, for example, be performed in generally the same manner as steps S4 and S5 represented in FIG. 16 and discussed above.

In step T9, in a manner similar to step T4 performed for VC 1, the terminal device sends a channel condition report derived from the measurement of channel conditions made on VC 2 to the base station using the uplink resources allocated in step T6.

In step T10 the base station determines whether the channel conditions on VC 2 are acceptable for supporting the needs of the terminal device with a desired level of performance. In this example it is assumed the base station determines from the reported channel conditions for VC 2 that the channel performance would not be sufficiently good, for example because the channel conditions on VC 2 are worse than VC 1, or only marginally better.

Thus, in a manner similar to step T6, in step T11 the base station communicates an indication of an uplink resource allocation on the next virtual carrier to be measured, in this example virtual carrier VC 3. This allocation is sent on the virtual carrier VC 2 to which the terminal device is currently tuned.

On receiving the allocation of uplink resources on virtual carrier VC 3, the terminal device interprets this as an indication that it should measure channel conditions on VC 3, and, as schematically represented in steps T12, T13 and T14, the terminal device proceeds to do this, and to report back to the base station. Steps T12, T13 and T14 performed for VC 3 are similar to, and will be understood from, steps T7, T8 and T9 performed for VC 2 in the previous iteration.

In step T15 the base station determines whether the channel conditions on VC 3 are acceptable for supporting the needs of the terminal device with a desired level of performance. In this example it is assumed the base station determines from the reported channel conditions for VC 3 that the channel performance would not be sufficiently good, for example because the channel conditions on VC 3 are worse than VC 1, or only marginally better.

Further iterations of steps corresponding to steps T11 to T15 are repeated for so long as the base station continues to determine the sequentially reported channel conditions for the different virtual carriers do not merit moving the mobile station to a new virtual carrier frequency location (or until all potential frequency locations have been considered). The processing represented in FIG. 17 continues from a point after which a number of these iterations have been performed and the base station has just determined from the reported channel conditions for virtual carrier VC N−1 that the channel performance for this virtual carrier would again not be sufficiently good, for example because the channel conditions on VC N−1 are worse than VC 1, or only marginally better.

Thus, in a manner similar to steps T6 and T11, in step T16 the base station communicates an indication of an uplink resource allocation on the next virtual carrier to be measured, in this example virtual carrier VC N. This allocation is sent on the virtual carrier VC N−1 to which the terminal device is currently tuned.

As with steps T7 to T9 and steps T11 to T14, the mobile station proceds to tune it is transceiver to virtual carrier VC N (step T17), to measure channel conditions on a virtual carrier VC N (step T18) and report on these channel conditions to the base station (step T19).

In step T20, in a manner corresponding to steps to T5, T10 and T15, the base station determines whether the channel conditions on VC N are acceptable for supporting the needs of the terminal device with a desired level of performance. In this example it is assumed the base station determines the reported channel conditions for VC N are sufficient and that it would be advantageous to move the terminal device to a virtual carrier VC N. As noted above, the threshold for the channel conditions at which it is considered advantageous to move a terminal device to a new virtual carrier will depend on the implementation at hand. In some cases the base station may take account of the upcoming scheduling requirements for the terminal device and decide to move the terminal device to a new virtual carrier if it is determined that the new virtual carrier can support these requirements while meeting a pre-defined performance requirement. In some other cases, the base station may simply be configured to move the terminal device to a new virtual carrier if the new virtual carrier is associated with measured channel conditions which are better than channel conditions for a currently used virtual carrier by a certain threshold amount.

Having determined it would be advantageous for the terminal device to in effect be moved from virtual carrier VC 1 to VCN, the base station may communicate this to the terminal device. In the example of FIG. 17 this is in effect communicated to the mobile station in an implicit manner by virtue of the fact that the base station does not send to the terminal device an allocation of uplink resources on a different virtual carrier to be used by the terminal device for reporting measure channel conditions on that virtual carrier. Instead, in accordance with the approach of FIG. 17, the base station simply proceeds in a step T21 to provide the terminal device with a downlink resource allocation on VC N in accordance with conventional techniques for downlink resource allocation (for example with signalling on a physical downlink control channel, PDCCH, associated with the virtual carrier VC N to which the terminal device is currently tuned). Furthermore, in a step T22 the base station communicates corresponding user plane data to the mobile station on the virtual carrier VC N (for example with signalling on a physical downlink shared channel, PDSCH, associated with the virtual carrier VC N to which the terminal device is currently tuned). Thus steps T21 and T22 represent normal virtual carrier downlink operation on virtual carrier VC N such that the terminal device has in effect been moved from virtual carrier VC 1 to virtual carrier VC N as a consequence of the base station determining this provides an operating improvement for the terminal device as a consequence of the improved channel conditions on VC N.

In principle the initial virtual carrier VC 1 might transpire to be the best virtual carrier available. In this case, the terminal device might iterate through all potential virtual carrier frequency locations as described above without the base station determining that any of the new virtual carrier frequency locations represents an improvement over VC 1. In this case, once the alternate virtual carriers have been considered, or once a subset of the alternate virtual carriers have been considered, without a virtual carrier with improved channel conditions being found, the base station may simply instruct the terminal device to retune to VC 1 (or the terminal device might be configured to automatically retune to VC 1 after measuring all other virtual carrier frequency locations) for continued operation on the virtual carrier VC 1.

Thus, FIG. 17 represents another approach by which a reduced-capability terminal device can estimate channel conditions for a range of different frequency locations to aid a base station in determining whether or not the terminal device should be moved from one virtual carrier frequency location to another virtual carrier frequency location.

It will again be appreciated that there are various modifications to the approach represented in FIG. 17 can be made in accordance with other embodiments of the invention.

For example, FIG. 17 schematically represents an embodiment in which uplink resources are sequentially allocated for each channel condition report (in steps T2, T6, T11 and T16). Each measure and report in this approach to some extent mirrors conventional techniques for reporting individual channel condition measurements on a physical uplink shared channel (PUSCH) in an LTE-type wireless telecommunications network. However, LTE-type wireless telecommunications networks also support channel condition reporting on a physical uplink control channel (PUCCH), and other embodiments of the invention may mirror this approach for reporting the individual measurement conditions. Thus, in some example embodiments uplink resources for reporting the information derived from the individual channel condition measurements for each virtual carrier might be communicated on resources associated with a physical uplink control channel (PUCCH) which are retained while a terminal device is connected. In this case there is no need for the base station to provide individual uplink resource allocations for each measurement of channel conditions. That is to say, in accordance with some embodiments there may be not be any steps corresponding to steps T6, T11 and T16 represented in FIG. 17. Instead, uplink resources for reporting on the individual channel condition measurements may be previously reserved in accordance with the general techniques of channel condition reporting on PUCCH. In these cases there may be different techniques to allow the terminal device to determine whether it should move onto measure the next channel conditions. For example, whereas in FIG. 17 the terminal device determines that it should retune and make another measure channel conditions based on receiving an uplink allocation message such as T6, in other examples the terminal device may be configured to simply continue measuring channel conditions on different virtual acid sequence until it receives a downlink resource allocation corresponding to step T1 in FIG. 17.

In accordance with some embodiments the order in which the virtual carrier channel conditions are measured may be different. For example if virtual carriers are relatively closely spaced, and the base station recognises that one virtual carrier has poor channel conditions, the base station might instruct the terminal device to retune to a virtual carrier which is not adjacent in frequency.

Furthermore, and this also applies for the embodiment represented in FIG. 16, in accordance with some examples a terminal device might be configured to measure channel conditions for a range of frequency locations which are not necessarily associated with pre-defined virtual carrier locations. For example, the mobile terminal might measure channel conditions at various frequency locations throughout an overall operating bandwidth for the wireless telecommunications system. Predicted channel conditions at other locations, for example corresponding to potential virtual carrier frequency locations, can be generated with interpolation/extrapolation techniques.

It will be appreciated that various modifications can be made to the embodiments described above without departing from the scope of the present invention as defined in the appended claims.

Furthermore, although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, terminal device etc. Furthermore, although the term base station has been used interchangeably with eNodeB it should be understood that there is no difference in functionality between these network entities.

Thus, apparatus and methods for providing feedback on channel conditions in a wireless telecommunications system are described. The wireless telecommunications system comprises a base station arranged to communicate with a plurality of terminals device using frequencies spanning a system frequency bandwidth, wherein at least one terminal device is a reduced capability terminal device comprising a tuneable transceiver configured to receive downlink transmissions from the base station using only a restricted frequency bandwidth which is smaller than and within the system frequency bandwidth. The base station transmits configuration signalling to the reduced capability terminal device to indicate the reduced capability terminal device should measure channel conditions for different frequencies. The terminal device responds by sequentially tuning its transceiver to different frequency locations for the restricted frequency bandwidth within the system frequency bandwidth and making measurements of channel conditions at the different frequency locations to provide a corresponding plurality of measurements of channel conditions. The reduced capability terminal device is configured to communicate information derived from the measurements of channel conditions to the base station. The information may comprise an indication of the measured channel conditions for the different frequency locations, or an indication of one or more frequency locations for which the corresponding measurement of channel conditions meet a pre-defined selection criterion. The base station subsequently schedules downlink transmissions for the terminal device in a manner that takes account of the information received from the terminal device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] ETSI TS 122 368 V10.530 (2011-07)/3GPP TS 22.368 version 10.5.0 (Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1121767.6
[11] UK patent application GB 1121766.8
[12] Holma H. and Toskala A, "LTE for UMTS OFDMA and SC-FDMA based radio access", John Wiley and Sons, 2009

The invention claimed is:

1. A method of operating a base station in a wireless telecommunications system comprising a base station arranged to communicate with a plurality of terminal devices using frequencies spanning a system frequency bandwidth, wherein at least one of the plurality of terminal devices is a reduced capability terminal device comprising a tuneable transceiver configured to receive downlink transmissions from the base station using a restricted frequency bandwidth which is smaller than and within the system frequency bandwidth, and wherein the method comprises:
transmitting, to the reduced capability terminal device, a plurality of resource allocation messages at different frequency locations within the system frequency bandwidth indicating uplink transmission resources to be used by the reduced capability terminal device to send respective ones of a plurality of channel condition reports;
receiving, from the reduced capability terminal device, information in the plurality of channel condition reports corresponding to a respective one of a plurality of measurements of channel conditions, wherein the information is derived from a plurality of measurements of channel conditions obtained by the reduced capability terminal device sequentially tuning its transceiver to different frequency locations for the restricted frequency bandwidth within the system frequency bandwidth and making measurements of channel conditions at the different frequency locations; and
scheduling subsequent downlink transmissions for the reduced capability terminal device on frequencies selected in a manner which takes account of the information received from the reduced capability terminal device.

2. A base station for use in a wireless telecommunications system comprising a base station arranged to communicate with a plurality of terminal devices using frequencies spanning a system frequency bandwidth, wherein at least one of the plurality of terminal devices is a reduced capability terminal device comprising a tuneable transceiver configured to receive downlink transmissions from the base station using a restricted frequency bandwidth which is smaller than and within the system frequency bandwidth, and wherein the base station is configured to:
transmit, to the reduced capability terminal device, a plurality of resource allocation messages at different frequency locations within the system frequency bandwidth indicating uplink transmission resources to be used by the reduced capability terminal device to send respective ones of a plurality of channel condition reports;
receive, from the reduced capability terminal device, information in the plurality of channel condition reports corresponding to a respective one of a plurality of measurements of channel conditions, wherein the information is derived from a plurality of measurements of channel conditions obtained by the reduced capability terminal device sequentially tuning its transceiver to different frequency locations for the restricted frequency bandwidth within the system frequency bandwidth and making measurements of channel conditions at the different frequency locations; and
schedule subsequent downlink transmissions for the reduced capability terminal device on frequencies selected in a manner which takes account of the information received from the reduced capability terminal device.

3. The base station of claim 2, wherein the different frequency locations for the restricted frequency bandwidth within the system frequency bandwidth comprise a plurality of predefined frequency locations.

4. The base station of claim 2, wherein the measurements of channel conditions comprise measurements of noise and/or measurements of interference.

5. The base station of claim 2, wherein the information received from the reduced capability terminal device comprises an indication of at least a subset of the plurality of measurements of channel conditions.

6. The base station of claim 2, wherein the information received from the reduced capability terminal device comprises an indication of a preferred frequency location for the restricted frequency bandwidth selected from within the system frequency bandwidth by the reduced capability terminal device in a manner which takes account of the plurality of measurements of channel conditions.

7. The base station of claim 6, wherein the information received from the reduced capability terminal device further comprises an indication of a measurement of channel conditions for the preferred frequency location.

8. The base station of claim 2, wherein the information received from the reduced capability terminal device comprises an indication of locations for the restricted frequency bandwidth within the system frequency bandwidth associated with measurements of channel conditions meeting a predefined criterion.

9. The base station of claim 2, wherein the information received from the reduced capability terminal device comprises an indication of one or more times associated with the plurality of measurements of channel conditions.

10. The base station of claim 2, wherein the downlink radio frame structure for the wireless telecommunications system comprises a series of time slots and the base station is configured to transmit reference signalling at different times and frequencies to allow the reduced capability terminal device to make measurements of channel conditions for different frequency locations in different time slots.

11. The base station of claim 10, further configured to transmit reference signalling at different times and frequencies to allow the reduced capability terminal device to make consecutive measurements of channel conditions for different frequency locations in non-consecutive time slots.

12. The base station of claim 2, wherein the base station is configured such that the information is received from the reduced capability terminal device with signalling on a radio resource control (RRC) or a media access control (MAC) layer which is higher than a physical layer.

13. The base station of claim 12, wherein the base station is configured such that the information is received from the reduced capability terminal device using RRC signalling.

14. The base station of claim 2, wherein the base station is configured such that the information is received from the reduced capability terminal device with physical layer signalling.

15. The base station of claim 2, wherein the base station is configured to transmit to the reduced capability terminal device an indication that the reduced capability terminal device should proceed to make the measurements of channel conditions at the different frequency locations.

16. The base station of claim 2, wherein the base station is configured to transmit an indication of the different frequency locations for the restricted frequency bandwidth within the system frequency bandwidth at which the reduced capability terminal device should make the plurality of measurements of channel conditions.

17. The base station of claim 2, wherein the base station is configured to transmit an indication to the reduced capability terminal device to indicate the reduced capability terminal device should retune its transceiver to a frequency location corresponding to the frequencies selected for the subsequent downlink transmissions.

* * * * *